(12) United States Patent
Kohara et al.

(10) Patent No.: US 6,814,382 B2
(45) Date of Patent: Nov. 9, 2004

(54) CAR DOOR STRUCTURE AND NOISE INSULATION SHEET

(75) Inventors: Yoshihiro Kohara, Hiroshima (JP); Mitsuaki Arata, Hiroshima (JP); Masami Isobe, Hiroshima (JP); Eiichi Baba, Hiroshima (JP); Tatsuo Kobayashi, Hiroshima (JP); Kouji Nawate, Hiroshima (JP); Hiroaki Miyahara, Hiroshima (JP); Shinichiro Emori, Hiroshima (JP)

(73) Assignee: Nishikawa Rubber Co., Ltd., Hiroshima (JP)

( * ) Notice: Subject to any disclaimer, the term of this patent is extended or adjusted under 35 U.S.C. 154(b) by 0 days.

(21) Appl. No.: 10/365,964

(22) Filed: Feb. 13, 2003

(65) Prior Publication Data

US 2003/0164624 A1 Sep. 4, 2003

(30) Foreign Application Priority Data

| Mar. 4, 2002 | (JP) | 2002-057771 |
| Mar. 4, 2002 | (JP) | 2002-057777 |
| Apr. 8, 2002 | (JP) | 2002-105663 |
| Apr. 26, 2002 | (JP) | 2002-126654 |
| Aug. 9, 2002 | (JP) | 2002-233542 |
| Aug. 29, 2002 | (JP) | 2002-250998 |
| Nov. 18, 2002 | (JP) | 2002-334292 |

(51) Int. Cl.[7] ............................................. B60R 13/08
(52) U.S. Cl. ..................................... 296/1.03; 296/39.3
(58) Field of Search ........................... 296/1.03, 39.1, 296/39.3, 146.1, 146.5, 146.7, 152, 154, 202; 181/210

(56) References Cited

U.S. PATENT DOCUMENTS

| 2,124,463 A | * | 7/1938 | Cunnington | ............... | 296/39.3 |
| 3,778,101 A | * | 12/1973 | Tsuda | ............... | 296/154 |
| 5,111,619 A | * | 5/1992 | Billin et al. | ............... | 49/502 |
| 5,224,299 A | * | 7/1993 | Abe | ............... | 49/502 |
| 5,345,720 A | * | 9/1994 | Illbruck et al. | ............... | 49/502 |
| 5,595,415 A | | 1/1997 | Beaulat | ............... | 296/39.1 |
| 6,183,038 B1 | * | 2/2001 | Hansen et al. | ............... | 296/146.7 |
| 6,207,244 B1 | | 3/2001 | Hesch | ............... | 428/35.9 |
| 6,302,472 B1 | * | 10/2001 | Rahmstorf et al. | ...... | 296/146.5 |
| 6,412,852 B1 | * | 7/2002 | Koa et al. | ............... | 296/146.7 |
| 6,561,562 B1 | | 5/2003 | Hesch | ............... | 296/39.3 |
| 2001/0030444 A1 | | 10/2001 | Whitehead et al. | ...... | 296/146.7 |
| 2003/0001408 A1 | * | 1/2003 | Hockenberry et al. | ... | 296/146.7 |
| 2003/0164624 A1 | * | 9/2003 | Kohara et al. | ............. | 296/146.7 |

FOREIGN PATENT DOCUMENTS

| DE | 4337468 A1 | 5/1994 |
| DE | 19632550 A1 | 2/1998 |
| EP | 0694426 A2 | 1/1996 |
| JP | 05-23376 | 6/1993 |
| JP | 10-119159 | 5/1998 |

OTHER PUBLICATIONS

Patent Abstracts of Japan vol. 1999, No. 01, Jan. 29, 1999 & JP 10 278586 A (Kanto Auto Works LTD), Oct. 20, 1998.

* cited by examiner

Primary Examiner—D. Glenn Dayoan
Assistant Examiner—Paul Chenevert
(74) Attorney, Agent, or Firm—Frishauf, Holtz, Goodman & Chick, P.C.

(57) ABSTRACT

A car door structure comprises a door inner panel 11, an interior door trim 12 and a noise insulation sheet 20. The interior door trim 12 is installed in the interior side of the door inner panel 11. The noise insulation sheet 20 is provided between the door inner panel 11 and the door trim 12, where it is hung down from the upper side to the lower side of the door inner panel like a curtain. The noise insulation sheet 20 is fixed to either the door inner panel 11 or the door trim 12. The noise insulation sheet 20 is provided at about an upper half or a lower half of the door inner panel 11, or it is provided at a central part of the door inner panel 11 while dividing approximately into three sections in a vertical direction or a horizontal direction.

20 Claims, 19 Drawing Sheets

CAR DOOR STRUCTURE AND NOISE INSULATION SHEET

BACKGROUND OF THE INVENTION

1. Field of the Invention

This invention relates to a car door structure comprising a door inner panel and a door trim, and a noise insulation sheet applied to the car door structure.

2. Description of the Related Arts

Conventionally, as shown in FIG. 27, an interior door trim, which is installed to the interior side of the door inner panel, is provided with felt 2 or urethane at the back side thereof, or the door inner panel is provided with an urethane foam in order to provide an efficient noise insulation effect to the inside of a car door 100.

For example, Japanese utility model publication No. 5–23376 discloses a door trim provided with a pad material consisting of an urethane foam and the like. Further, Japanese unexamined patent publication No. 10–119159 discloses a noise insulation cover made of an urethane foam.

[Problems to be Solved by the Invention]

However, the noise insulation effects in the prior arts were deficient since the felt 2, urethane, pad material, and a noise insulation cover were all prepared separate from the door inner panel or the door trim, and they were installed merely in a smaller part of the door trim 1 or the interior side of a door inner panel.

Further, there was a difficulty in an installation operation because they had to be installed in a certain area of the door inner panel or the door trim.

An object of the present invention, therefore, is to provide a car door structure which has an efficient noise insulation effect and is easy to install.

SUMMARY OF THE INVENTION

A car door structure according to a first aspect of the invention comprises a door inner panel (11), an interior door trim (12) and a noise insulation sheet (20). The interior door trim (12) is installed in the interior side of the door inner panel (11). The noise insulation sheet (20) is provided between the door inner panel (11) and the door trim (12), where it is hung down from the upper side to the lower side of the door inner panel like a curtain (more specifically a Japanese style curtain called "noren"). The noise insulation sheet (20) is fixed to either the door inner panel (11) or the door trim (12).

A car door structure according to a second aspect of the invention comprises a door inner panel (11), an interior door trim (12) and a noise insulation sheet (20). The door trim (12) is installed in the interior side of the door inner panel (11). The noise insulation sheet (20) is provided between the door inner panel (11) and the door trim (12), where it is hung down from the upper side to the lower side of the door inner panel (11) like a curtain. The noise insulation sheet (20) is fixed to either the door inner panel (11) or the door trim (12) at the upper part thereof.

A car door structure according to a third aspect of the invention comprises a door inner panel (11), an interior door trim (12) and a noise insulation sheet (20). The door trim (12) is installed in the interior side of the door inner panel (11). The noise insulation sheet (20) is provided between the door inner panel (11) and the door trim (12), where it is hung down from the upper side to the lower side of the door inner panel (11) like a curtain. The noise insulation sheet (20) is fixed to either the door inner panel (11) or the door trim (12) at the left side part (105) and right side part (105) thereof A car door structure according to a fourth aspect of the invention is invented based on the invention claimed in claim 1, 2 or 3, wherein the noise insulation sheet (20) is provided at about an upper half or a lower half of the door inner panel (11). A car door structure according to a fifth aspect of the invention is also invented base on the invention claimed in claim 1, 2 or 3, wherein the noise insulation sheet (20) is provided at a central part of the door inner panel (11). The central part is the mid portion of the door inner panel (11) when it is divided approximately into three sections in a vertical direction or a horizontal direction.

A car door structure according to a sixth aspect of the invention comprises a door inner panel (11), an interior door trim (12), a noise insulation sheet (20), an inner weather strip (15) and a door glass (102). The door trim (12) is installed in the interior side of the door inner panel (11). The inner weather strip (15) comprises seal lips (17, 18) which make resilient contacts with the door glass (102). The inner weather strip is secured to the door inner panel (11) or the door trim (12). The noise insulation sheet (20) is provided between the door inner panel (11) and the door trim (12), where it is hung down from the upper side to the lower side of the door inner panel (11) like a curtain. The noise insulation sheet (20) is fixed to the inner weather strip at the upper part thereof.

A car door structure according to a seventh aspect of the invention comprises a door inner panel (11), an interior door trim (12), a noise insulation sheet (20) and a door glass (102). The door trim (12) is also provided over the door inner panel (11) to the interior side of the door inner panel (11). The inner weather strip comprises seal lips (17, 18) for making resilient contacts with the door glass (102). The weather strip is provided at the upper part of the door trim (12). The noise insulation sheet (20) is hung down between the door inner panel (11) and the door trim (12) like a curtain, covering at least the upper edge of the door inner panel.

A car door structure according to an eighth aspect of the invention is based on the seventh aspect of the invention, in which the upper end of the noise insulation sheet (20) is fixed to the inner weather strip (15). A car door structure according to a ninth aspect of the invention is also based on the seventh aspect of the invention, in which the upper end of the noise insulation sheet (20) is fixed to the door trim (12) or the door inner panel (11).

A car door structure according to a tenth aspect of the invention is also invented based on the seventh aspect of the invention, in which the door trim (12) comprises a channel part (13) at the upper part thereof. The channel part (13) receives an attachment base (16) of the inner weather strip (15). The channel part (13) has a concave shape in section. The channel part (13) is provided with leg parts (14) at the lower end thereof, which extends in a downward direction. Each leg part (14) supports a part (19) of the inner weather strip (15) from underneath. The noise insulation sheet (20) is fixed between the leg parts (14) and some portions of the inner weather strip (15) corresponding to the leg parts (14).

A car door structure according to a eleventh aspect of the invention is also invented based on the seventh aspect of the invention, in which the door trim (12) comprises a channel part (13) at the upper part thereof. The channel part (13), having a concave shape in section, receives an attachment base (16) of the inner weather strip (15). The channel part (13) comprises leg parts (14) at the lower part thereof with certain intervals, which extend in a downward direction. Each leg part (14) receives a part (19) of the inner weather strip (15). The upper part of the noise insulation sheet (30) is fixed to some parts (19) of the inner weather strip (15) where the leg parts (14) are unprovided and the inner weather strip (15) is exposed. The noise insulation sheet (30) is unfixed at portions where the leg parts (14) are provided as the upper end of the sheet (30) is lowered.

A car door structure according to a twelfth aspect of the invention comprises a door inner panel (11), an interior door trim (12), a noise insulation sheet (20) and an inner weather strip (15). The door trim (12) is installed in the interior side of the door inner panel (11). The noise insulation sheet (20) is provided between the door inner panel (11) and the door trim (12), where it is hung down from the upper side to the lower side of the door inner panel (11) like a curtain. The upper end of the noise insulation sheet (20) is fixed to either the door inner panel (11), the door trim (12) or the inner weather strip (15). The inner weather strip (15) is fixed to the door inner panel (11) or the door trim (12). The door trim (12) is provided with pins (39) at both sides or/and the lower side. The pins (39) project toward the door inner panel (11). The pins (39) position the noise insulation sheet (20) not to protrude out of the edge of the door trim (12) by passing through or pushing the noise insulation sheet (20) to the door inner panel (11).

A car door structure according to a thirteenth aspect of the invention comprises a door inner panel (11), an interior door trim (12), a noise insulation sheet (20) and an inner weather strip (15). The door trim (12) is installed in the interior side of the door inner panel (11). The noise insulation sheet (20) is provided between the door inner panel (11) and the door trim (12), where it is hung down from the upper side to the lower side of the door inner panel (11) like a curtain. The upper end of the noise insulation sheet (20) is fixed to either the door inner panel (11), door trim (12) or the inner weather strip (15). The weather strip (15) is fixed to the door inner panel (11) or the door trim (12). The noise insulation sheet (20) is provided with clips (40) at both sides and/or the lower side thereof. The clips (40) position the noise insulation sheet (20) to the door trim (12) not to protrude out of the edge of the door trim (12).

A car door structure according to a fourteenth aspect of the invention, which is invented based on the thirteenth aspect of the invention, is characterized that the clips (40) are also capable of fixing the noise insulation sheet (20) to the door inner panel (11).

A car door structure according to a fifteenth aspect of the invention is invented based on the fourteenth aspect of the invention, in which each clip (40) comprises a neck part (41), a head part (42), an umbrella part (43), and a leg part (44). The head part (42) is bulgingly formed above the neck part (41), while the umbrella part (43) is bulgingly formed below the neck part (41). The leg part (44) is formed below the umbrella part (43). Each clip (40) is secured to the noise insulation sheet (20) by inserting the head part (42) into a hole (20a) of the noise insulation sheet (20). The noise insulation sheet (20) is fixed to the door trim (12) by engaging the neck part (41) with an attachment part provided in the door trim (12). The noise insulation sheet (20) is fixed to the door inner panel (11) by inserting the leg part (44) into a hole (11a) provided in the door inner panel (11).

A car door structure according to a sixteenth aspect of the invention comprises a door inner panel (11), an interior door trim (12), a noise insulation sheet (20) and an inner weather strip. The door trim (12) is installed in the interior side of the door inner panel (11). The noise insulation sheet (20) is provided between the door inner panel (11) and the door trim (12), where said noise insulation sheet (20) is hung down from the upper side to the lower side of the door inner panel (11) like a curtain. The upper end of the noise insulation sheet (20) is fixed to either the door inner panel (11), the door trim (12) or the inner weather strip (15). The inner weather strip (15) is secured to the door inner panel (11) or the door trim (12). The door trim (12) comprises groove parts (50, 51, 52) continuously or intermittently at the periphery of the door inner panel (11) side. Each groove part (50, 51 or 52) has a concave shape in section. The noise insulation sheet (20) is pushed at the edge part thereof into the groove parts (50, 51, 52) of the door trim (12), thereby it is positioned that the edge part thereof does not protrude out of the door trim (12).

A car door structure according to a seventeenth aspect of the invention is invented based on the sixteenth aspect of the invention, in which the groove part (50) is uniformed with the door trim (12).

A car door structure according to an eighteenth aspect of the invention comprises a door inner panel (11), an interior door trim (95), a noise insulation sheet (20) and an inner weather strip (90). The door trim (95) is installed in the interior side of the door inner panel (11). The inner weather strip comprises seal lips (57, 58) which make resilient contacts with a door glass (102), and it is fixed to the door inner panel (11). The noise insulation sheet (20) is provided between the door inner panel (11) and the door trim (95), where it is hung down from the upper side to the lower side of the door inner panel (11) like a curtain. The noise insulation sheet (20) is fixed to the inner weather strip (90) at the upper part thereof. The inner weather strip (90) is fitted with the upper end (11c) of the door inner panel (11).

A car door structure according to a nineteenth aspect of the invention, which is invented based on the eighteenth aspect of the invention, is characterized in that the inner weather strip (90) is provided with an attachment mechanism at the interior side thereof. The upper end of the noise insulation sheet (20) is inserted into the attachment mechanism for an attachment.

A car door structure according to a twentieth aspect of the invention is invented based on the nineteenth aspect of the invention, in which the attachment mechanism is composed of a groove part (70) and a plurality of projection pieces (73, 74). The groove part (70) has a concave shape in section. The projection pieces (73, 74) project from the side walls (61, 71) toward the bottom wall (72) of the channel part.

A car door structure according to a twenty first aspect of the invention, which is invented based on eighteenth, nineteenth or twentieth aspect of the invention, is characterized in that the door trim (95) is provided with pressing pieces (80) at the periphery thereof. The pressing pieces (80) project toward the door inner panel (11) and they press the noise insulation sheet (20) to the door inner panel (11) when installed.

A noise insulation sheet (20) according to a twenty second aspect of the invention is comprised in a car door structure (100). The car door structure (100) comprises a door inner panel (11), an interior door trim (12) and an inner weather strip (15). The door trim (12) is installed in the interior side of the door inner panel (11). The lower end (12b) of the door trim (12) positions above the lower end (11b) of the door inner panel (11). The noise insulation sheet (20) is provided between the door inner panel (11) and the door trim (12). The upper end of the noise insulation sheet (20) is fixed to either the door inner panel (11), door trim (12) or an inner weather strip (15) which is fixed to the door inner panel (11) or the door trim (12). The noise insulation sheet (20) is hung down from the upper side to the lower side of the door inner panel (11) like a curtain, and it is fixed to the interior side of the door inner panel (11). The lower part of the noise insulation sheet (20) is protruded from the lower end of the door trim (12).

The numeral in each parenthesis indicates the correspondence element or correspondence matter indicated in the drawings and the embodiments of the invention mentioned thereinafter.

According to the first, second, third, sixth and seventh aspects of the inventions, a new room is provided between the door inner panel and the door trim as the noise insulation sheet is hung down between the door inner panel and the door trim like a curtain. With this newly provided room, the noise insulation effect improves compared to the conventional arts which are provided with felt, urethane, pad material, the noise insulation cover, and the like.

Further, the noise insulation sheet can be easily installed since it is merely hung down from the upper side to the lower side like a curtain. That is, the noise insulation sheet can be installed merely by fixing any portion thereof to the door inner panel or the door trim as described in the first aspect of the invention. Particularly, the noise insulation sheet can be installed by fixing the upper end thereof to either the door inner panel or the door trim as described in the second aspect of the invention, or by fixing the left and right sides thereof to the door inner panel or the door trim as described in the third aspect of the invention, or further by fixing the upper portion thereof to the inner weather strip which is secured to the door inner panel or the door trim as described in the sixth aspect of the invention.

Further, according to the seventh aspect of the invention, the noise insulation sheet covers at least the upper part of the door inner panel, so that a leakage of the noise through the upper portion of the door inner panel can be mitigated.

Furthermore, only the upper portion of the noise insulation sheet should be fixed to the inner weather strip as the eighth aspect of the invention, or to the door trim or the door inner panel as the ninth aspect of the invention for an installation of the entire noise insulation sheet. Therefore, it is easy to install. Particularly, according to the eighth aspect of the invention, an installation operation is completed by merely attaching the inner weather strip, which is provided with the noise insulation sheet in advance, to the door trim, so that an installation operation can be done easily.

Although, it is preferable that the noise insulation sheet should be provided a length similar to the height (width in a vertical direction) of the door inner panel in order to obtain a sufficient noise isolation effect, the length of the noise insulation sheet may be ½ or ⅓ (or even ⅔) of the height of the door inner panel. Therefore, as the fourth aspect of the invention for example, the noise insulation sheet may be provided at the upper half or lower half of the door inner panel. Further, as the fifth aspect of the invention, the noise insulation sheet may be provided in the mid portion of the door inner panel when the panel is divided into three sections in a vertical direction or a horizontal direction.

By arranging so, the material cost of the noise insulation sheet can be lowered, and an installation operation becomes easier as the noise insulation sheet becomes smaller in size.

According to the tenth aspect of the invention, the noise insulation sheet can be firmly fixed since the upper end of thereof is fixed between the leg parts of the door trim, which supports some portions of the inner weather strip from underneath, and a part of the inner weather strip.

According to the eleventh aspect of the invention, the noise insulation sheet can be saved in quantity for an amount that the sheet is unprovided at the leg parts as the upper edge thereof is lowered. Further, an adhesion nature of the support part against the leg parts increases because the noise insulation sheet is unprovided between the leg parts and the support part of the inner weather strip.

According to the twelfth aspect of the invention, the noise insulation sheet does not protrude out of the edge of the door trim, and the noise insulation effect does not decrease nor the outlook of the door decreases since the noise insulation sheet is hung down between the door inner panel and the door trim like a curtain, while the both sides or the lower part of the noise insulation sheet is adequately positioned by the pins or clips.

Particularly, according to the thirteenth, fourteenth and fifteenth aspects of the invention, the edge portion of the noise insulation sheet is sufficiently prevented from protruding out to the door trim because the clips are provided at both sides or the lower portion of the noise insulation sheet.

According to the sixteenth and seventeenth aspects of the invention, an outlook of the car door structure does not decrease since the edge part of the noise insulation sheet, which is hung down like a curtain between the door inner panel and the door trim, is pushed into the groove having a concave shape in section and is fixed not to protrude out of the edge of the door trim.

Further, a decline of the noise isolation effect can be prevented which would come out if the noise insulation sheet protrudes from the edge of the door trim.

According to the eighteenth, nineteenth, twentieth and twenty first aspects of the invention, the noise insulation effect improves since two rooms are created between the door inner panel and the door trim by an installation of the noise insulation sheet between the door inner panel and the door trim. Further, it is unnecessary to transport the door trim with the door inner weather strip secured to the door trim to an installation field because the door inner weather strip is secured to the door inner panel and it is not secured to the door trim.

That is, the inner weather strip alone or the inner weather strip with the noise insulation sheet secured to the inner weather strip can be transported to the installation field separated from the door trim or the door inner panel, so that those parts can be transported to the installation field in a smaller size, and that a transportation operation becomes easier.

Furthermore, a removing operation of the harness becomes easier during an installation operation since operators are able to reach their hands to the harness of the door from any side area of the door.

And, the installation operation can be pursued efficiently because the door installation operation can be completed by checking the harness with operators' eyes.

Further, the installation operation can be performed easily since the noise insulation sheet can be fixed merely by inserting the upper end of the sheet to the inner weather strip. And, the noise insulation sheet can be firmly fixed to the inner weather strip because a plurality of projection pieces of the attachment mechanism tightly stick to and hold the upper end of the noise insulation sheet both from the outer and interior sides of the car when the installation operation is completed.

Furthermore, the noise insulation sheet is prevented from shifting its position and an outlook of the door structure can be properly maintained since the door trim is provided with pressing pieces at the door inner panel side, which press the noise insulation sheet to the door inner panel when the sheet is installed.

According to the twenty second aspect of the invention, fewer noise invades or leaks through a gap formed at the lower part of the door between the lower part of the door trim and the door inner panel, and the noise isolation effect further increases because the lower part of the noise insulation sheet, which is hung down like a curtain between the door inner panel and the door trim, protrudes from the bottom edge of the door trim, and the protruded part of the sheet is fixed to the interior side of the door inner panel.

Further, much less time is required in an installation operation, and a better outlook of the door structure can be obtained since the protruded part of the noise insulation sheet, extending from the lower end of the noise insulation sheet, is applied to the lower part of the door structure, instead of applying an individual part which is prepared separate from the noise insulation sheet.

DESCRIPTION OF PREFERRED EMBODIMENTS (First Embodiment of the Invention)

Figure 1:
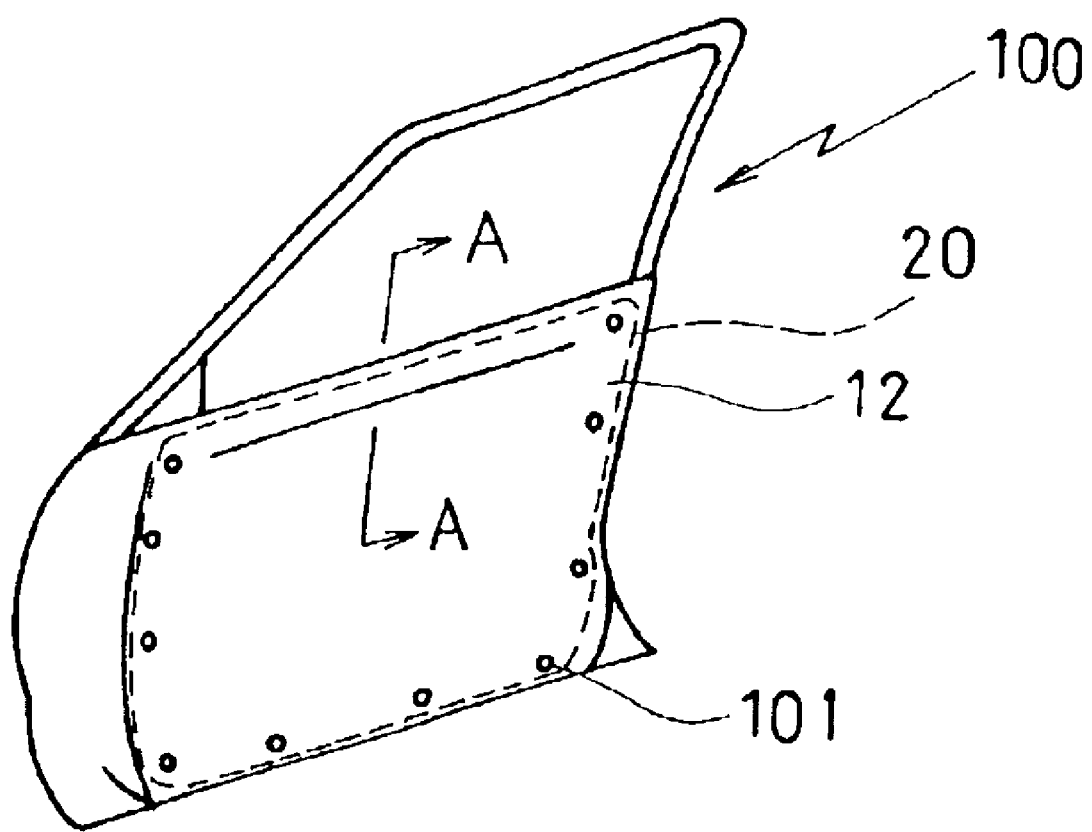
FIG. 1 is a perspective view showing a car door structure according to a first aspect of the invention.
Figure 2:
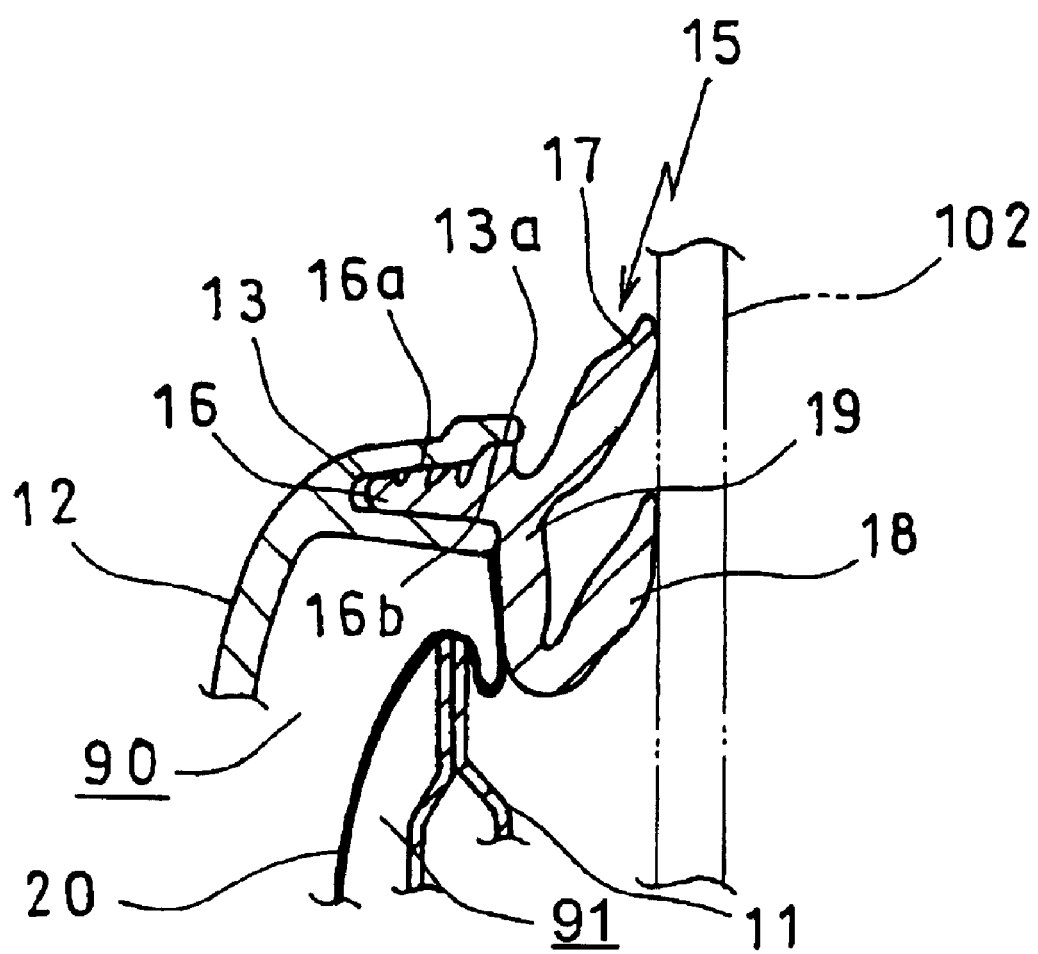
FIG. 2 is an enlarged sectional view along line A—A in FIG. 1.

Referring to FIGS. 1 and 2, a car door structure according to a first embodiment of the invention will be described. FIG. 1 is a perspective view showing a car door structure according to the first embodiment of the invention. FIG. 2 is an enlarged sectional view along line A—A line FIG. 1.

This car door structure comprises a door inner panel 11 which forms a part of a door 100 and is situated inside the belt-line of a car. An interior door trim 12 is installed above and the interior side of the door inner panel 11. A inner weather strip 15 is installed in the upper portion of the door trim 12, which makes a resilient contact with a door glass 102.

The inner weather strip 15 is composed of an attachment base 16, a pair of seal lip parts 17, 18 and a support part 19. The seal lip 17 is positioned above the deal lip 18, and both lips 17, 18 make resilient contacts with a door glass 102 from the interior side of the car. The door glass 102 slides in an upward and downward directions. The support part 19 extends from the attachment base 16 in the downward direction while supporting the seal lips 17, 18. The support part 19 is uniformed with the attachment base 16 and it forms a rectangular shape in section with a combination of the attachment base 16. The attachment base 16 is provided with a plurality of lip parts 16a and a positioning projection 16b at the upper surface thereof (they may be provided at the lower surface thereof). In this embodiment, the inner weather strip 15 is not provided with an insert, but it may be provided with the insert. Further, in this embodiment, a pair of seal lip parts 17, 18 are formed at an upper side and a lower side of the inner weather strip 15, but only a single seal lip may be provided and a number of the seal lips are unlimited.

At the upper part of the door trim 12, there is provided a channel part 13 where the attachment base 16 of the inner weather strip 15 is tightly inserted. Further, a step 13a is formed at the opening tip part of the channel part 13 toward the outside of the width direction. When the inner weather strip 15 is connected to the door trim 12, the positioning projection 16b of the attachment base 16 contacts and engages with the step 13a.

In between the door inner panel 11 and the door trim 12, a noise insulation sheet 20 is hung down from the upper side to the lower side like a curtain, and the upper end of the noise insulation sheet 20 is fixed to the support part 19 of the inner weather strip 15. The noise insulation sheet 20 covers at least the upper end of the door inner panel 11 in order to prevent noise leaks from the upper part.

As shown in FIG. 2, by providing the noise insulation sheet 20 between the door inner panel 11 and the door trim 12, two space rooms 90, 91 can be created out of a single room, so that the noise insulation effect of the car door structure improves.

It has become clear as a result of an experimental test that the car door structure according to the embodiment of the present invention can insulate noise more than 2 dB in the range of 100 to 10,000 Hz compared to the prior art which uses felt, urethane, pad material or a noise insulation cover.

Although the quality of the material of the noise insulation sheet 20 is not strictly limited, it is desirable to employ a cloth having a high sound absorption nature. Among commercial products, for example, Sumitomo 3M Corporation's "THINSULATE"(trademark) may be employed as a material of the noise insulation sheet. In addition, as far as it is sheet-like, a sheet made of such as rubber or nylon can be employed as the noise insulation sheet.

As described above, since the noise insulation sheet 20 can be installed by merely hanging down from an upper side to a lower side like a curtain, it is easy to install the noise insulation sheet. Especially, when such a noise insulation sheet 20 is used which is attached in advance to the support part 19 of the inner weather strip 15, an installation operation can be easily completed by merely inserting the inner weather strip 15 into the channel part 13 of the door trim 12.

The noise insulation sheet 20 may be left hung down, or it may be fixed with clips 101 which are used for securing the door trim 12 to the door inner panel. Further, it is possible to fix the noise insulation sheet 20 to the door inner panel or the door trim using a double-sided adhesive tape, adhesives, a stapler or the like.

Figure 3A:
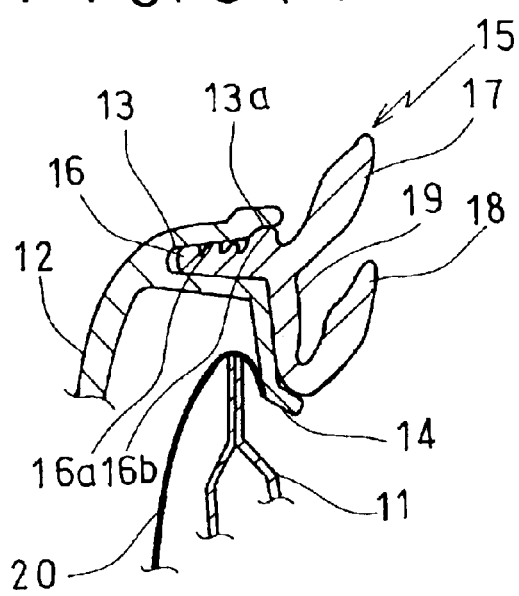
FIGS. 3(a) and 3(b) are enlarged sectional view along line A—A in FIG. 1 showing another embodiment of a first aspect of the invention.
Figure 3B:
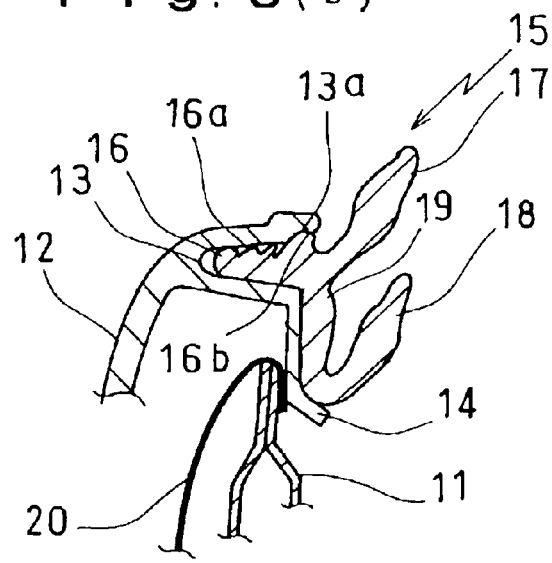

Although, in this embodiment, the noise insulation sheet 20 is fixed to the support part 19 of the weather strip 15, it can be fixed to other parts of the weather strip 15 as well. Further, as shown in FIG. 3(a), the upper portion of the noise insulation sheet 20 can be attached to the door trim 12 side, in this case, the leg part 14 of the door trim 12 (it is not limited to the leg part 14, and it can be fixed to the opposite side of the leg part 14 beyond the door inner panel 11 as well (which is the area shown in the left hand side in FIG. 3)). Further, as shown in FIG. 3(b), the upper end of the noise insulation sheet 20 can be attached to the door inner panel 11 side (it is not restricted to the part which covers the upper part of the door inner panel 11).

Figure 4:
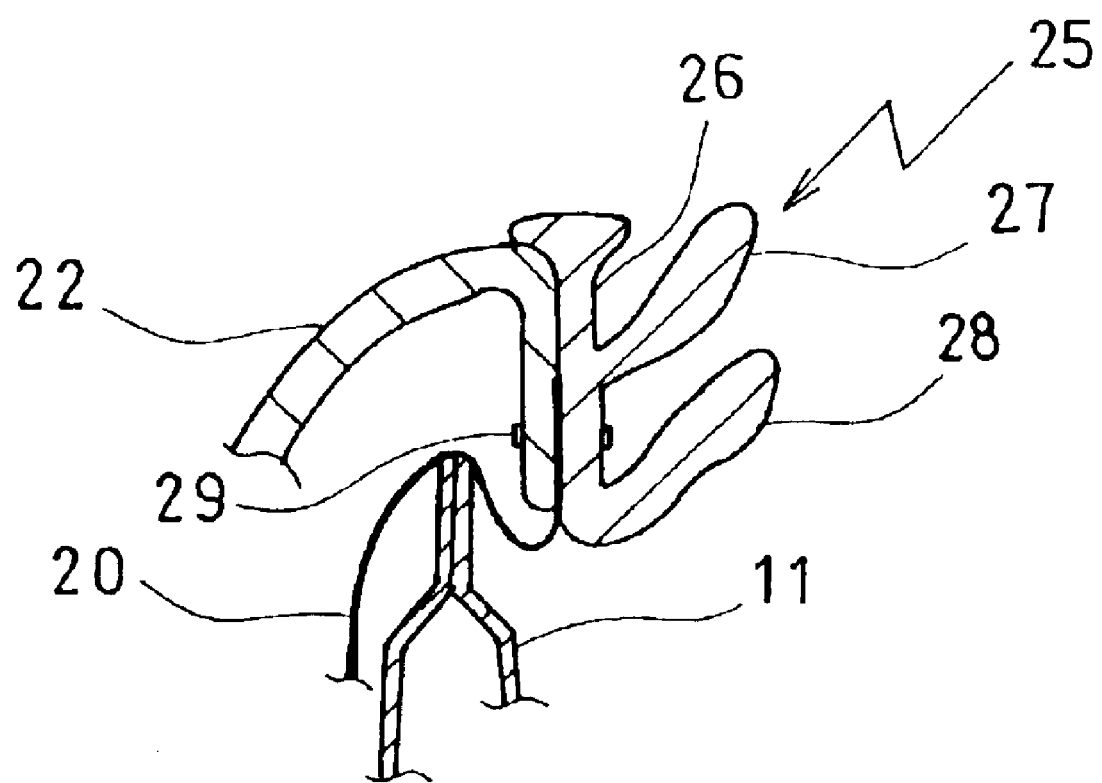
FIG. 4 is an enlarged sectional view along line A—A in FIG. 1 showing another embodiment of a first aspect of the invention.
Figure 5:
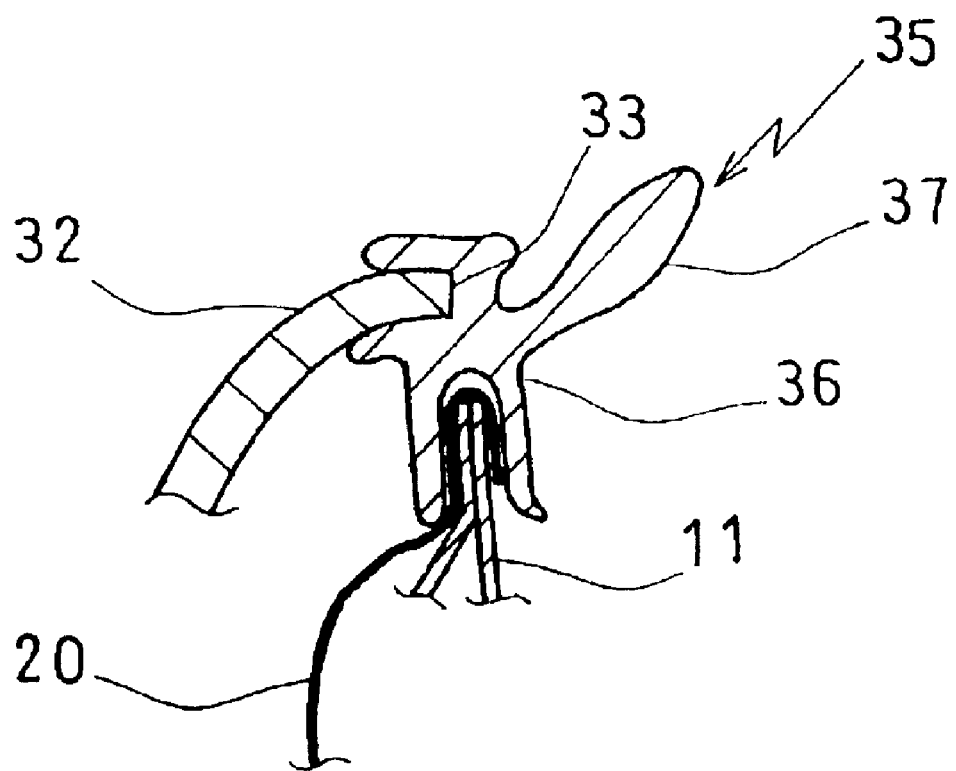
FIG. 5 is an enlarged sectional view along line A—A in FIG. 1 showing another embodiment of a first aspect of the invention.

Further, although this embodiment demonstrates the door structure that the attachment base 16 of the inner weather strip 15 is inserted into the channel part 13 of the door trim 12, which is formed at the upper part thereof, the inner weather strip 15 may be installed to any portion other than the channel part 13. For example, as shown in FIG. 4, the attachment base 26 of the inner weather strip 25 can be fixed to the door trim 22 whose tip is bent, by means of a tap 29 such as a nail. Or, as shown in FIG. 5, the tip of the door trim 32 may be inserted into a channel part 33 formed in the inner weather strip 35. Furthermore, the door trim 12 or 32 and the inner weather strip 15 or 35 can be fixed by welding the whole or part of the channel part 33 of the inner weather strip 35 or the attachment base 16 of the inner weather strip 15, shown in FIG. 2, to the corresponding part of the door trim 12 or 32. Moreover, although it is not illustrated, such an inner weather strip may be used, which is fixed to the door inner panel 11 in advance.

Furthermore, it is effective to make a slit in the noise insulation sheet 20 in order to easily install or remove a harness such as a door handle, power windows and a lock to a door panel at the time of an installation operation.

It is effective to make a length of the noise insulation sheet 20 substantially equivalent to the height (longitudinal width) of the door inner panel 11 in order to install the noise insulation sheet 20 to the entire portion of the door inner panel 11. However, even if the length of the sheet 20 is about ½ or ⅓ (or as well as ⅔) of the height of the door inner panel 11, the noise insulation effect can be efficiently acquired.

Figure 6:
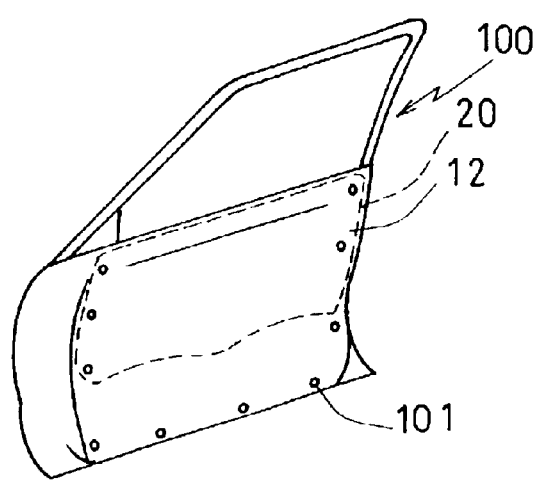
FIGS. 6(a) to 6(d) are perspective view showing another embodiment of a first aspect of the invention.
Figure 6:
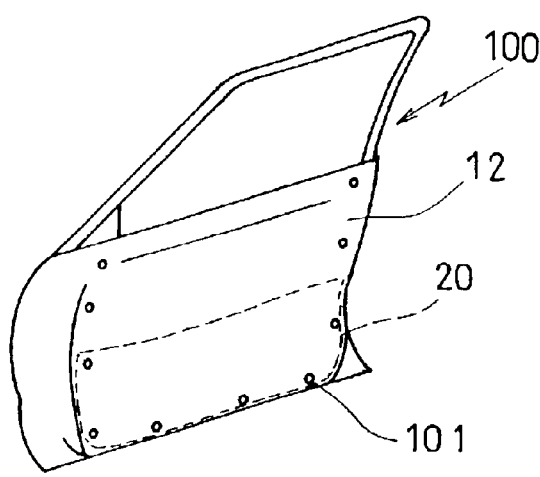
Figure 6:
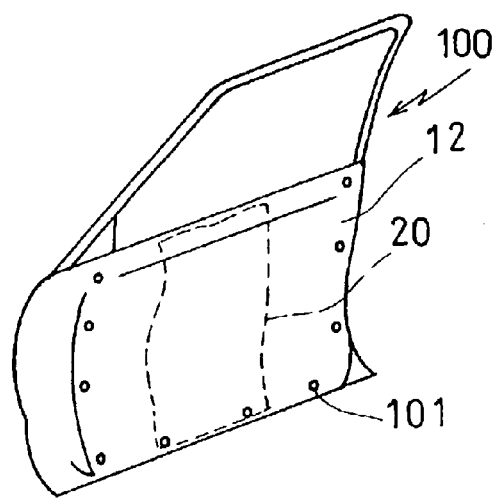
Figure 6:
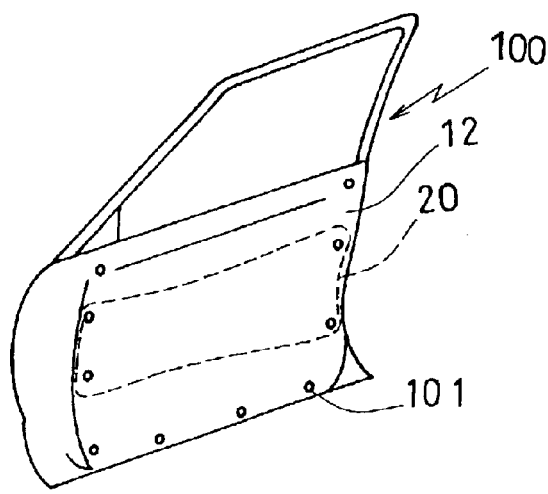

Therefore, for example as shown in FIGS. 6(a), (b), the noise insulation sheet 20 can be installed in about an upper half or a lower half of the door inner panel 11. Or, as shown in FIGS. 6(c), (d), the noise insulation sheet 20 can be installed in the central part of the door inner panel 11, dividing equally the door inner panel 11 into three sections in a longitudinal direction or a horizontal direction.

By arranging so, the noise insulation sheet 20 can be saved in its material cost, and it is easily installed as it becomes smaller in size.

Moreover, according to this embodiment, although it is not illustrated, the noise insulation effect will further improves as the noise insulation sheet 20, which is hung down like a curtain, is fixed at the left and right sides or the lower side thereof by means of such as clips, adhesives, and a double-sided adhesive tape.

Figure 7:
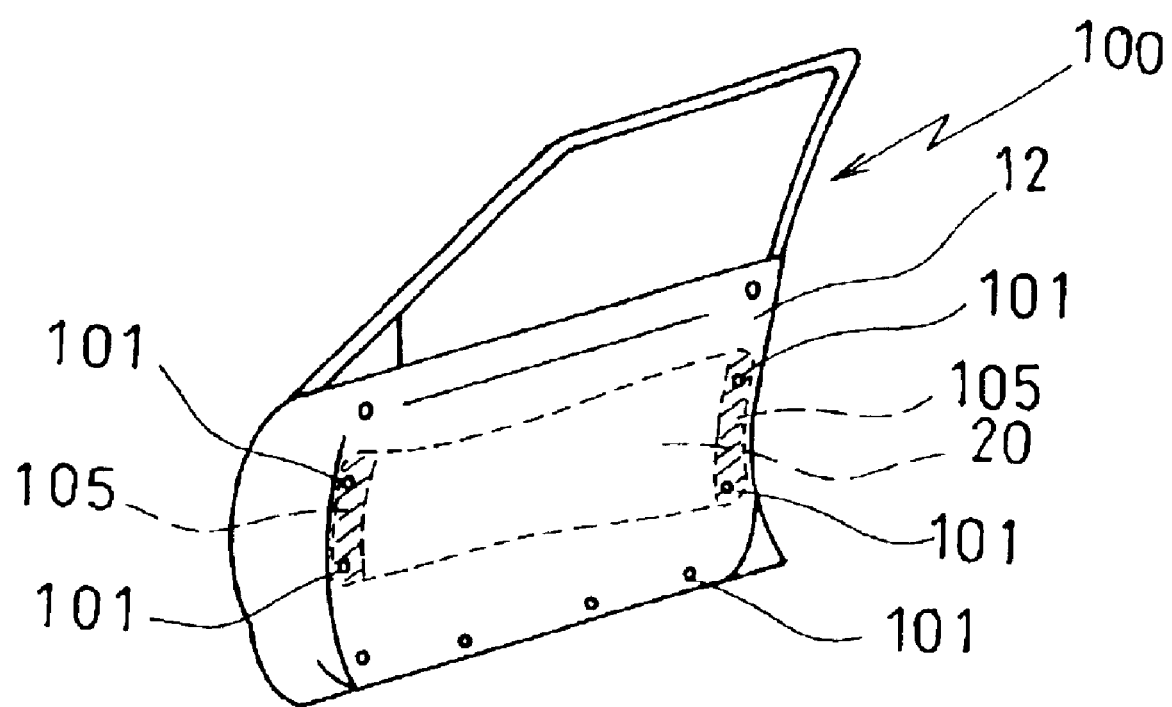
FIG. 7 is a perspective view showing another embodiment of a first aspect of the invention.

Further, although in this embodiment, the noise insulation sheet 20 is fixed to the door inner panel 11 or the door trim 12 at the upper part thereof, the sheet 20 can be fixed to the door inner panel 11 or the door trim 12 at other than upper part. A fixing portion is not limited to the upper part of the sheet 20. For example, as shown in FIG. 7, the noise insulation sheet 20 while being hung down like a curtain can be fixed at its right and left side ends 105, 105 which corresponds to the right and left sides of a door 100, with fixing means such as clips, adhesives, and a double-sided adhesive tape. The fixing operation may be performed with either clips, adhesives, or the double-sided adhesive tape, or it may be performed with a combination thereof.

The noise insulation sheet 20 according to this embodiment has an additional effect in preventing noise generated as the door trim 12, 22 or 32 and the door inner panel 11 contact with each other.

(Second Embodiment of the Invention)

Figure 8:
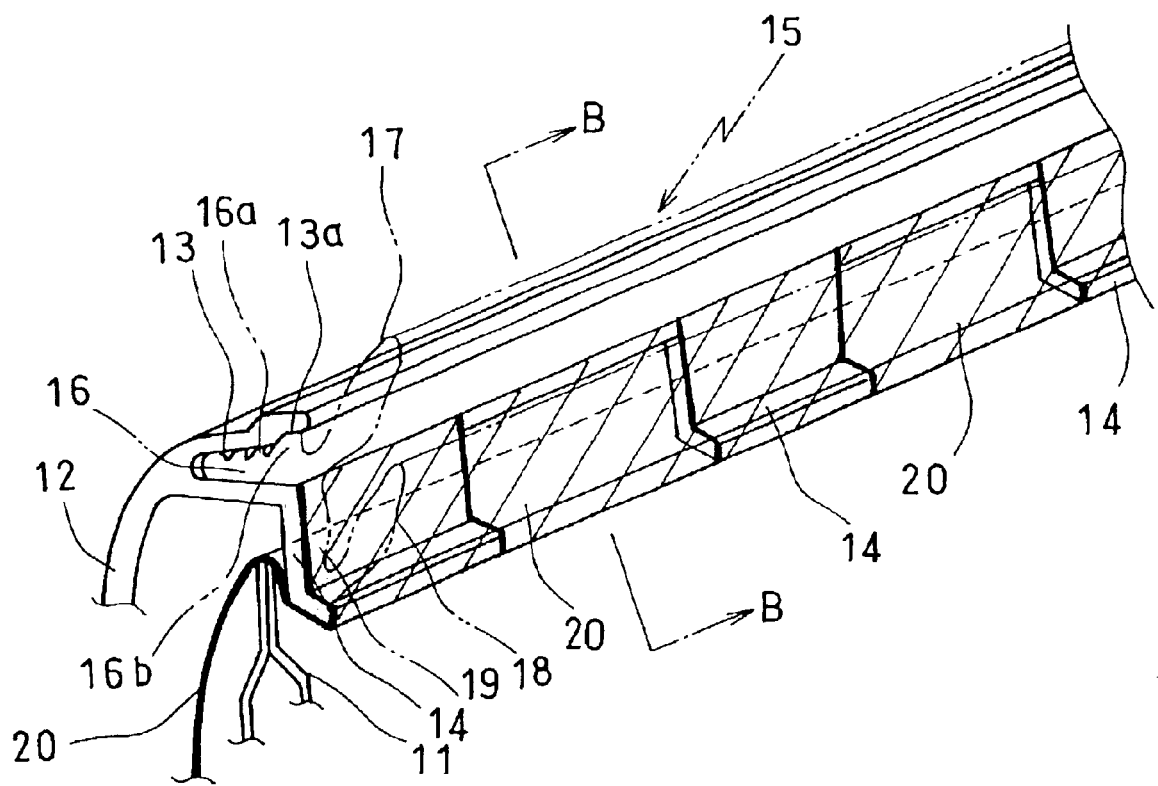
FIG. 8 is a perspective view showing a primary part of a second aspect of the invention.
Figure 9:
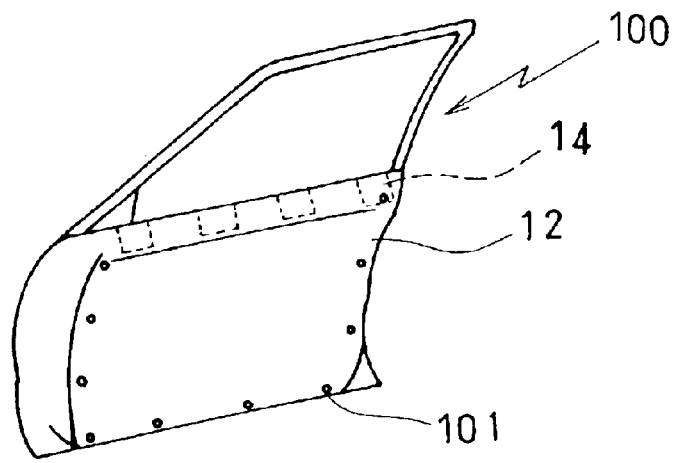
FIG. 9 is a perspective view of an outlook of a car door structure where the structure shown in FIG. 8 is installed.

Referring to FIGS. 8 and 9, the second embodiment of a car door structure according to the present invention will be described. Identical numerals are given to the identical parts described in the first embodiment, and explanation thereof will be excluded.

FIG. 8 is a perspective view showing a principal part of a car door structure according to the second embodiment of the present invention. FIG. 9 is a perspective view showing an out look of a car door structure in which the structure shown in FIG. 8 is installed.

In FIG. 8, the weather strip 15 is illustrated with a phantom line, and the area the noise insulation sheet 20 is located is illustrated with the slash for convenience.

A sectional view along line B—B in FIG. 8 is equivalent to the drawing shown in FIG. 2.

A car door structure according to the second embodiment of the present invention comprises, similar to the first embodiment, a door inner panel 11 and a door trim 12 which is installed over the upper portion and the interior side of the door inner panel. The inner panel 11 forms a part of a car door structure and is positioned inside the belt line of the car. The door trim 12 is provided with an inner weather strip 15 at the upper part thereof, which makes a resilient contact with a door glass 102. The door trim 12 comprises leg parts 14 with certain intervals, which is the structure dissimilar to the first embodiment of the present invention.

That is, the door trim 12 comprises a channel part 13 at the upper part thereof, to which the base part of the inner weather strip 15 is inserted. The door trim 12 comprises leg parts 14 which extend from the lower end of the channel part 13 further to the lower direction thereof like the inner weather strip 15. Each leg part 14 has a rectangular shape in section and supports the support part 19 of the inner weather strip 19 from underneath. Each leg part 14 leans aslant to support the support part 19 sufficiently. Further, each leg 14 is formed for every predetermined interval with a fixed width. Accordingly, the support part 19 of the inner weather strip 15 is exposed to the inside area of the door trim 12 at portions where the leg parts 14 are unprovided.

The upper end of the noise insulation sheet 20 is fixed to the support part 19 of the inner weather strip 15 between the support part 19 and the leg parts 14 where the leg parts 14 are provided. That is, as shown in FIG. 8, the noise insulation sheet 20 passes between the upper end of the door inner panel 11 and the inner weather strip 15 covering the leg parts 14, and it is carried at the top portion of the door inner panel 11 and is hung down in the downward direction. Moreover, as shown in a sectional view along line B—B in FIG. 8 (which corresponds to FIG. 2 of the first embodiment), the noise insulation sheet 20 is fixed to the support part 19 where the leg parts 14 are unformed.

Although in this embodiment, the leg parts 14 are formed in the door trim 12 with the intervals between them, the leg parts 14 can be uniformed continuously extending in the longitudinal direction without intervals. Or, the leg parts 14 may not be formed at all.

(Third Embodiment of the Invention)

A third embodiment of a car door structure according to the present invention will be described referring to FIGS. 10 and 11.

Figure 10:
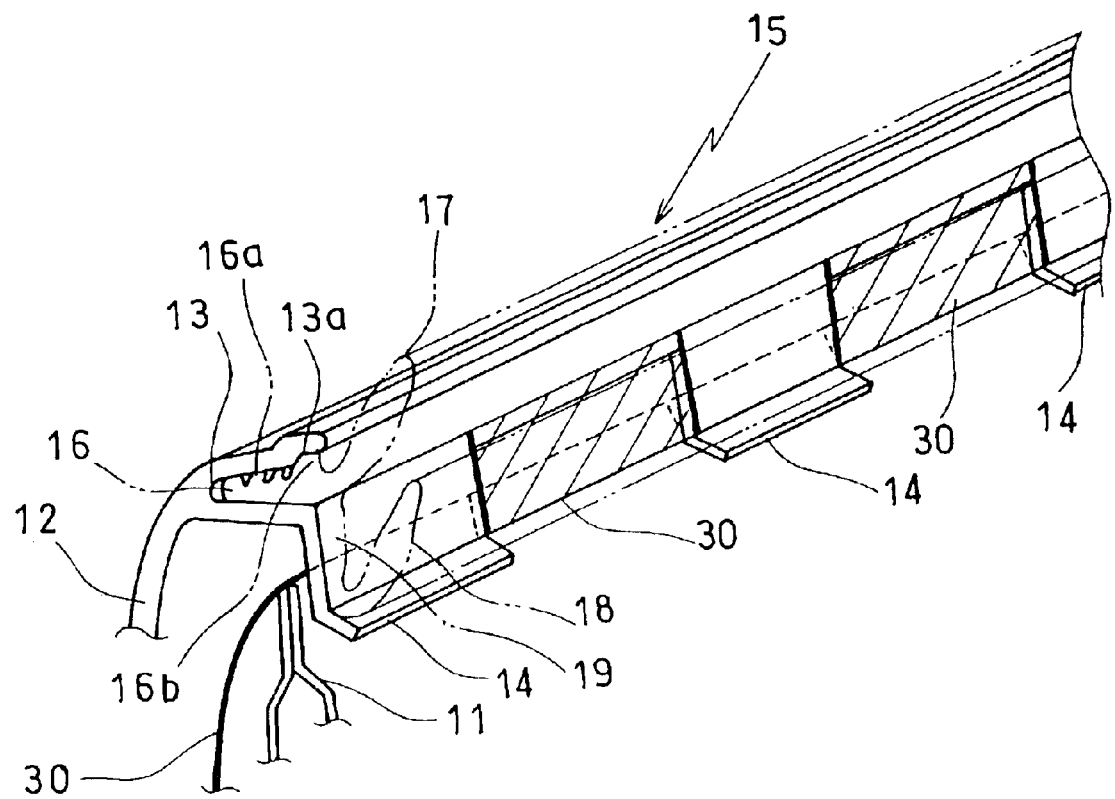
FIG. 10 is a perspective view showing a primary part of a car door structure according to a third aspect of the invention.
Figure 11:
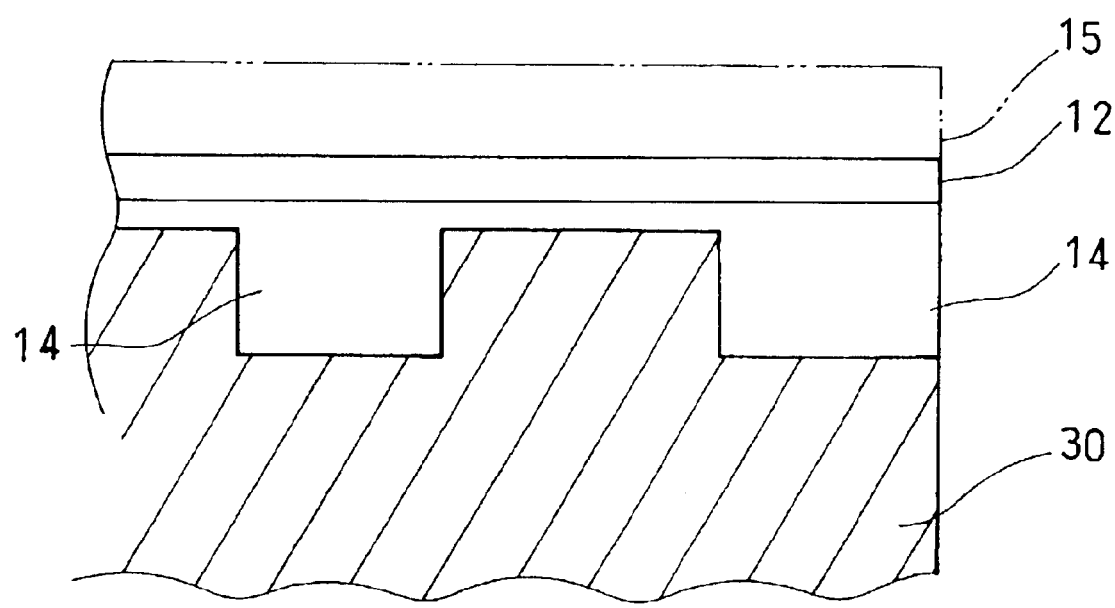
FIG. 11 is an elevation view showing an attached noise insulation sheet.

In FIG. 10, the inner weather strip 15 is illustrated with a phantom line, and the area the noise insulation sheet 30 locates is illustrated with slash, for convenience.

In comparison with the second embodiment of the invention described above, in this embodiment, a door trim 12 and an inner weather strip 15 are similar in shape, but a means for fixing the upper part of a noise insulation sheet 30 is dissimilar.

That is, as shown in a sectional view along line B–B in FIG. 8 (which corresponds to FIG. 2 of the first embodiment), the upper part of the noise insulation sheet 30 is fixed to the support part 19 where leg parts 14 are not formed, which structure is similar to the noise insulation sheet 20 in the second embodiment. However, unlike the second embodiment of the invention, the upper end of the noise insulation sheet 30 is not fixed to the support part 19 of the door trim 12 are formed and the upper end of the sheet 20 is lowered to the bottom end of the leg parts 14.

According to this embodiment, it is unnecessary to provide the noise insulation sheet 30 to the portions where the leg parts 14 are formed as the upper end of the sheet 30 is lowered to the bottom end of the leg parts 14, so that the noise insulation sheet 30 can be saved in quantity. Further, the support part 19 improves in its adhesion nature against the inner weather strip 15 at portion where the noise insulation sheet 30 is unprovided since no sheet 30 is furnished between the support part 19 and the weather strip 15.

(Fourth Embodiment of the Invention)

As shown in FIG. 2 of the first embodiment of the invention, there is a problem that the both sides or the lower part of the noise insulation sheet 20 would protrude out of the door trim 12 when the noise insulation sheet 20 is hung down and fixed at the end portion thereof.

In case, the noise insulation sheet 20 protrudes out of the door trim 12, an outlook of the car door structure will worsen, and the noise insulation effect thereof will also worsen.

Therefore, an object of the fourth embodiment of the present invention is to firmly fix the ends of a noise insulation sheet, which is provided between a door inner panel and a door trim, and to position the noise insulation sheet so as not to protrude out of the door trim.

Figure 12:
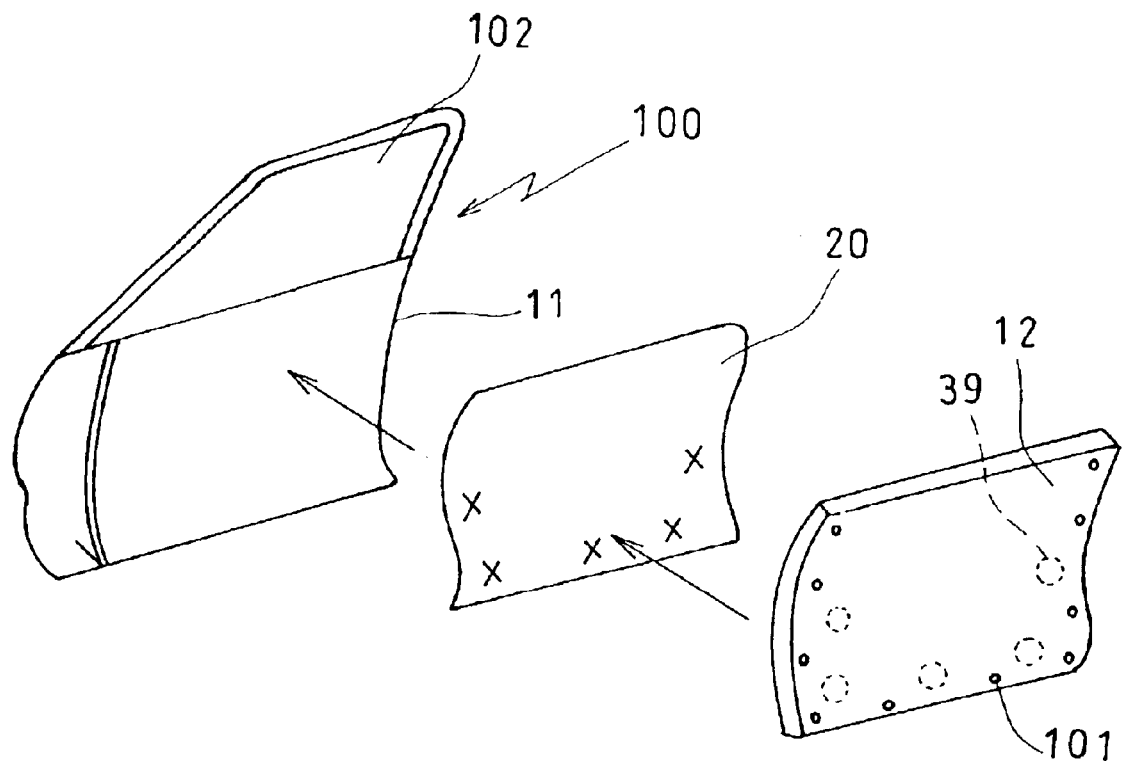
FIG. 12 is a decomposed perspective view showing a car door structure according to a fourth aspect of the invention.
Figure 13:
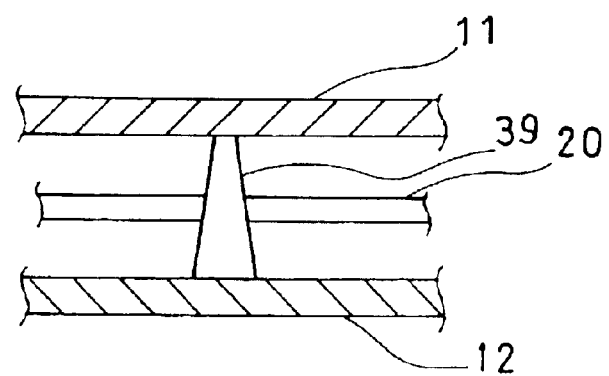
FIG. 13 is a sectional view showing a primary part of a car door structure according to a fourth aspect of the invention.

Referring to FIGS. 12 and 13, the fourth embodiment of a car door structure according to the present invention will be described. FIG. 12 is a disassembled perspective view showing a car door structure according to the fourth embodiment of the invention. FIG. 13 is an enlarged sectional view showing a primary part of structure shown in FIG. 12. Identical numerals are given to the identical parts described in the first or the prior embodiments, and explanation thereof will be excluded.

The door trim 12 is provided with pins 39 at the left and right sides and the lower side thereof projecting to the side of a door inner panel 11. (FIG. 12 illustrates an embodiment having five pins 39. The pins 39 may be provided to the left and right sides of the door trim 12 only or the lower side only.) The pin 39 is not limited to any form in shape. In this embodiment, the tip of the pin 39 is projected, and the bottom of the pin 39 is fixed to the door trim 12.

And, as shown in FIG. 13, each pin 39 penetrates the noise insulation sheet 20, thereby fixing both left and right sides and the lower part of the noise insulation sheet 20 to the door inner panel 11, and positioning the insulation sheet 20 not to protrude out of the edge of the door trim. In FIG. 12, x marks are provided on the noise insulation sheet, which indicate the points the pins 39 penetrate. The door trim 12 is fixed to the door inner panel 11 with clips 101. Each pin 39 is provided between the clips 101 at the inner side of the clips 101.

In this embodiment, the noise insulation sheet 20 is fixed at both the left and right sides as well as the lower part while it is positioned not to protrude out of the edge of the door trim 12 by penetrating the pins 39 therethrough. The noise insulation sheet 20 can also be positioned as it is pressed to the door inner panel 11 by the pins 39.

(Fifth Embodiment of the Invention)

Figure 14:
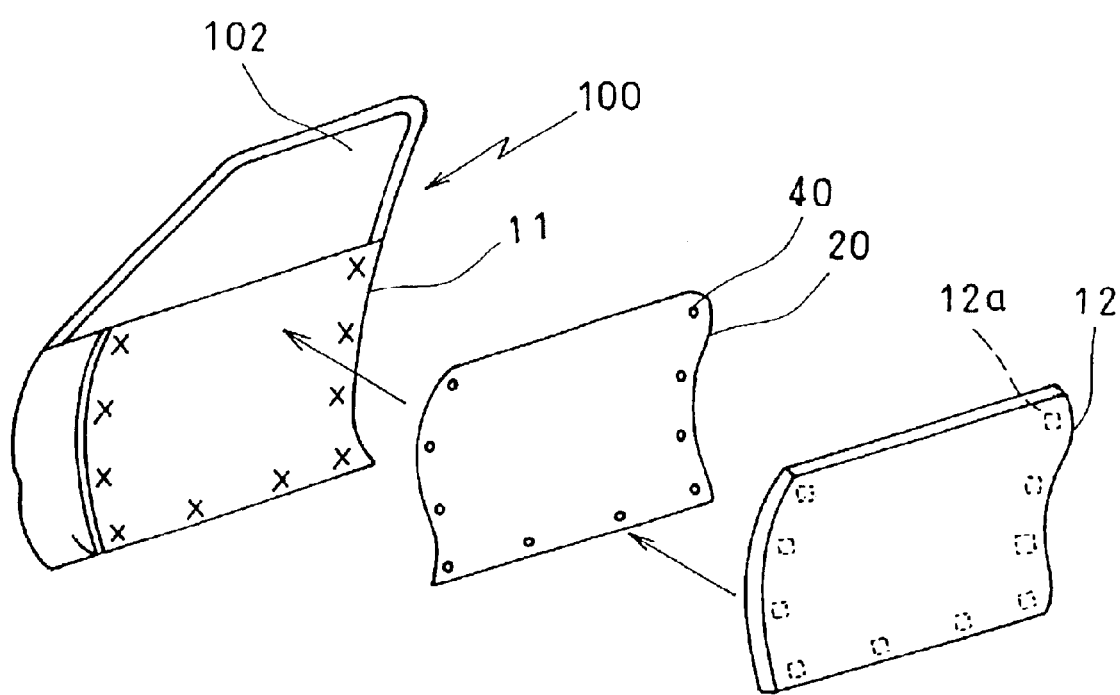
FIG. 14 is a decomposition perspective diagram showing the door structure for cars related to the fifth operation form of this invention.
Figure 15:
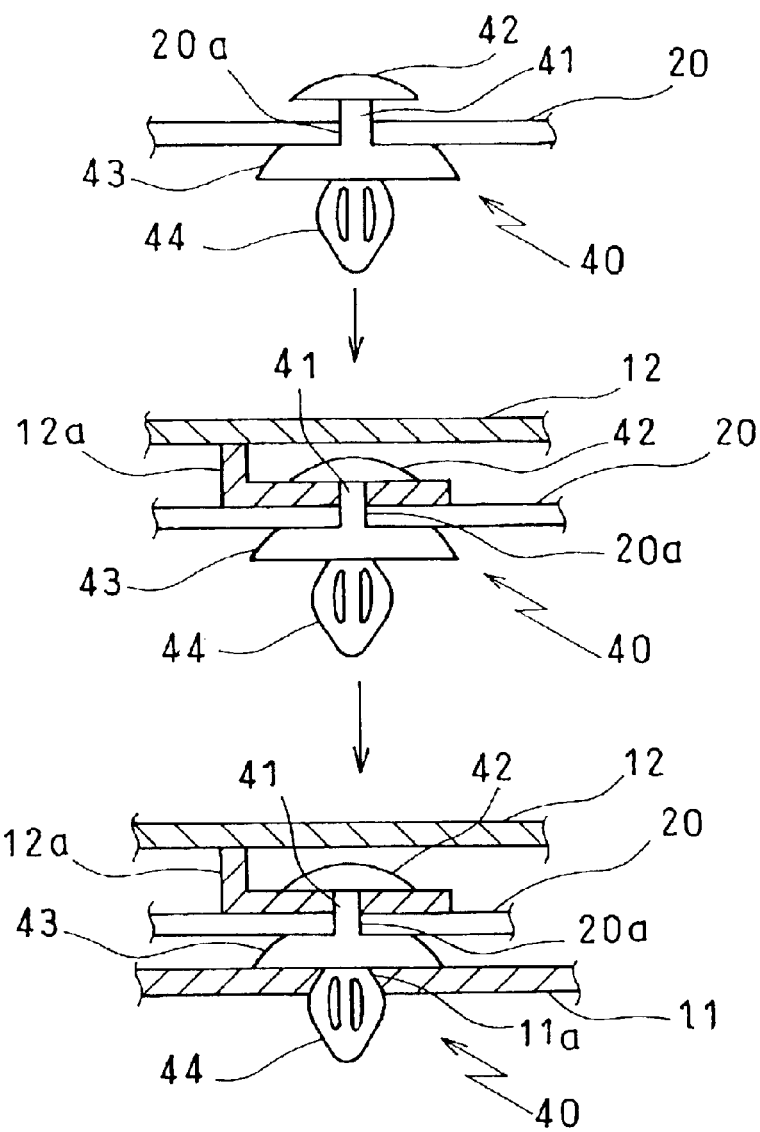
FIG. 15 is a sectional view showing a primary part of a car door structure according to a fifth aspect of the invention.
Figure 16:
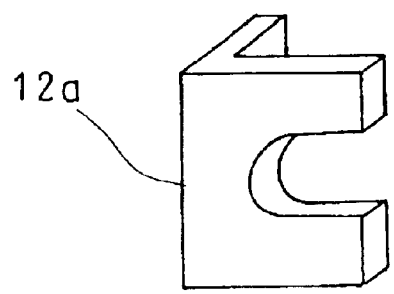
FIG. 16 is a perspective view showing an attachment part of a clip shown in FIG. 15.

Referring to FIGS. 14–16, the fifth embodiment of a car door structure according to the present invention will be described. FIG. 14 is a perspective view showing a car door structure according to the fifth embodiment of the invention. FIG. 15 is an enlarged sectional view showing a primary part of the view shown in FIG. 14. Further, FIG. 16 is a perspective view showing a clip attachment part of a clip shown in FIG. 15.

According to the embodiment of the car door structure, the noise insulation sheet 20 is provided with clips 40 as a fixing means at the side thereof as shown in FIG. 14, instead of comprising the pins 39 as described in the fourth embodiment.

Each clip 40 comprises a head part 42 bulgingly formed above a neck part 41, an umbrella part 43 bulgingly formed below the neck part 41 being formed greater than the head part 42 in size, and a leg part 44 formed below the umbrella part 43.

As shown in FIG. 14 and FIG. 15, the clips 40 are attached to the noise insulation sheet 20 at both the left and right sides and the lower part thereof as well as each clip 40 is inserted into a hole 20a formed in the sheet 20. (It is effective even if the clips 40 are attached only to the left and right sides or the lower part of the sheet 20.) Further, the noise insulation sheet 20 is fixed to the door trim 12 by engaging the neck part 41 of the clip 40 with an U-shaped engaging hole of a clip attachment part 12a fixed to the door trim 12. And, the noise insulation sheet 20 is fixed to the door inner panel 11 by inserting the leg part 44 of the clip 40 into the hole 11a formed in the door inner panel 11.

Accordingly, the noise insulation sheet 20 can be accurately positioned as such that the both left and right sides and the lower part of the sheet 20 does not protrude out of the edge of the door trim 12. In FIG. 14, x marks are illustrated to indicate points the leg parts 44 of the clips 40 are to be inserted.

As the door trim 12 is fixed to the door inner panel 11 with the clips 40, the clips 101 illustrated in FIG. 12 are unneeded to apply. Moreover, both the clips 40 and the clips 101 can be applied together.

(Sixth Embodiment of the Invention)

An object of the sixth embodiment of the present invention is, similar to the fourth embodiment, to firmly fix the edge portion of a noise insulation sheet, which is hung down between the door inner panel and the door trim, and position the sheet not to protrude out of the door trim.

Figure 17:
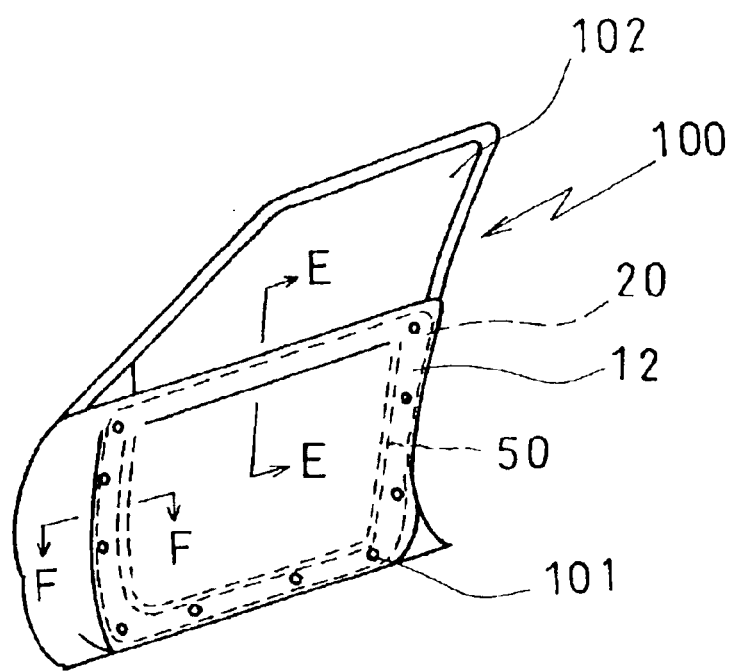
FIG. 17 is a perspective view showing an outlook of a car door structure according to a sixth aspect of the invention.
Figure 18:
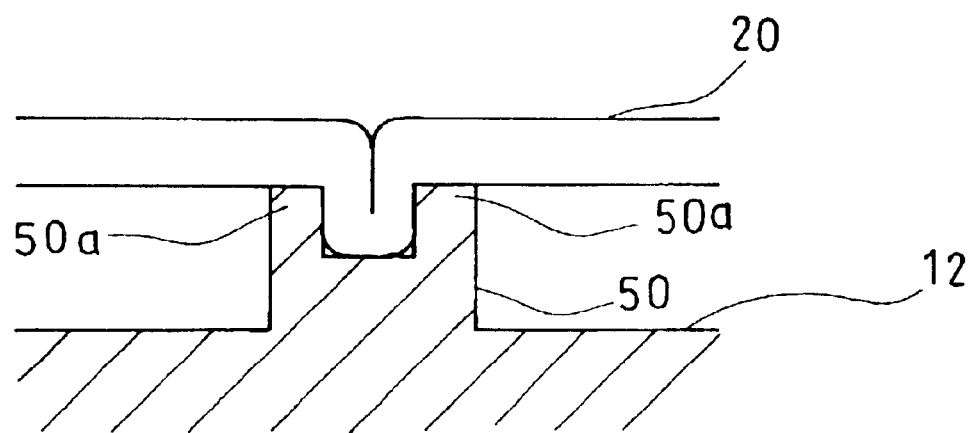
FIG. 18 is an enlarged sectional view along line F—F in FIG. 17 showing a primary part of a car door structure according to a sixth aspect of the invention.
Figure 19:
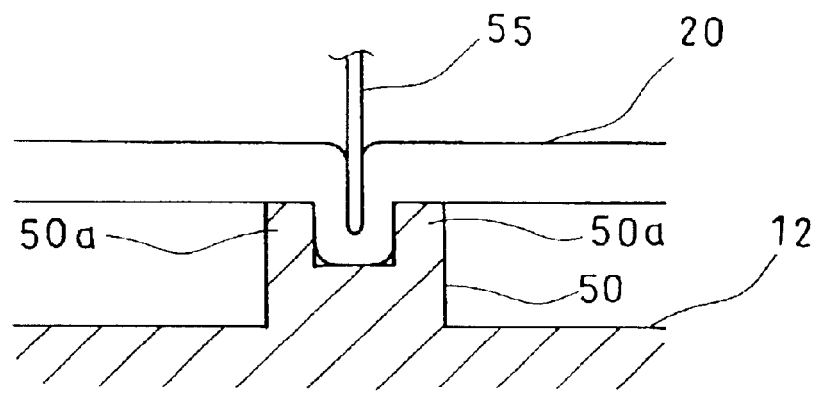
FIG. 19 is a sectional view showing a condition where a noise insulation sheet is pushed into a channel shown in FIG. 18.

Referring to FIGS. 17, 18 and 19, the sixth embodiment of a car door structure according to the present invention will be described. FIG. 17 is a perspective view showing a car door structure according to the sixth embodiment of the invention. FIG. 18 is an enlarged sectional view along line F—F in FIG. 17. FIG. 19 is a sectional view showing a condition where a noise insulation sheet is fixed to a groove as it is forced into the groove. An enlarged sectional view along line E—E in FIG. 17 corresponds to the view shown in FIG. 2 of the first operation form.

Identical numerals are given to the identical parts described in the first embodiment, and explanation thereof will be excluded.

According to this embodiment, as shown in FIG. 18, a groove 50 having a channel shape in section is uniformed with the door trim 12 at the periphery of the door trim 12 at the side of the inner panel 11, which runs, in this embodiment, along the left and right sides and the lower part of the door trim 12. Although the channel 50 is continuously formed in this embodiment, it may be formed intermittently.

The end portion of the noise insulation sheet 20 is fixed to the groove 50 as it is pushed into the groove 50, so that the edge portion of the noise insulation sheet 20 is secured not to protrude out of the door trim 12.

As shown in FIG. 19, the end portion of the noise insulation sheet 20 is folded into two parts and is pushed into the channel 50 using a stick or board-shaped jig 55 having or not having a roller at the top thereof. The end portion of the noise insulation sheet is pushed into the groove 50 and is firmly fixed as it is clamped by the left wall 50a and the right wall 50a of the groove 50.

Although, the door trim 12 is fixed to the door inner panel 11 with clips 101, the end portion of the noise insulation sheet 20 can be fixed with the clips 101 as well.

The shape of the channel 50 is not limited to the one shown in FIG. 18, and it may have any shape as far as it is able to clamp and fix the end portion of the noise insulation sheet 20.

Figure 20:
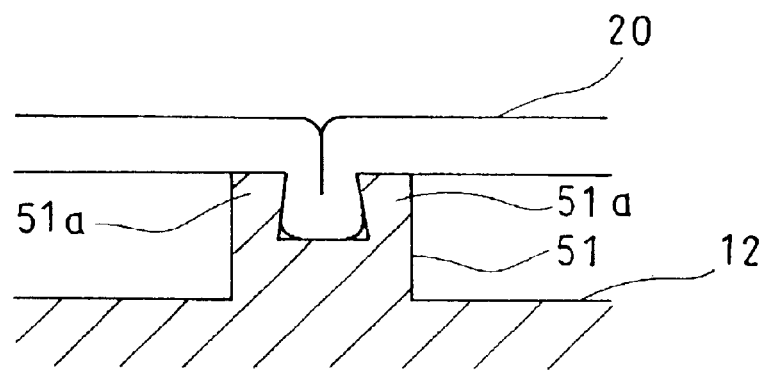
FIG. 20 is a sectional view showing a primary part of another door structure for cars according to a sixth aspect of the invention.

For example, as shown in FIG. 20, the groove 51 may be formed such that both the left side and the right side walls 51a, 51a are formed thicker in the inner side toward the top end thereof, while the inner surfaces thereof are tapered to widen toward the bottom end. Further, as shown in FIG. 21, the groove 52 may be formed such that the top end of the left side and the right side walls 52a, 52a are bent inside, thereby forming the top end of the walls 52a like a hook, and making the groove comprising a wider space portion and a narrower space portion.

Figure 21:
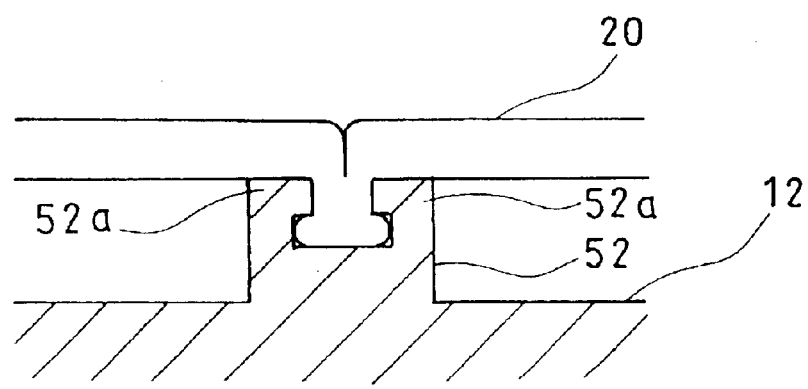
FIG. 21 is a sectional view showing a primary part of another door structure for cars according to a sixth aspect of the invention.

The structures shown in FIGS. 20 and 21 are superior than the structure shown in FIG. 18 in firmly fixing the end portion of the noise insulation sheet 20. However, the latter is better than the former in removing the molded part from the mold, which comprises the groove 50 uniformed with the door trim.

(Seventh Embodiment of the Invention)

There is another problem to be solved. As shown in FIG. 2 of the first embodiment, even though the noise insulation sheet 20 is provided between the door inner panel 11 and the door trim 12, the outcome of the noise insulation effect of the sheet occasionally reduced as a noise invades or leaks through the lower part of a door structure between the lower part of the door trim 12 and the inner panel 11.

There was a prior art which was able to increase a noise insulation effect by attaching a noise absorbing material to a crevice formed at the lower part of the door. However, such conventional art required much time and effort for an installation operation of the material, and an outlook of the door structure was poor since, as described previously, the material was formed separate from the door parts and attached to the door partially.

Therefore, an object of the seventh embodiment of the present invention is to further increase the noise insulation effect by lessening a noise invading and leaking through a crevice formed between the lower part of the door trim and the door inner panel, using a noise insulation sheet.

Figure 22:
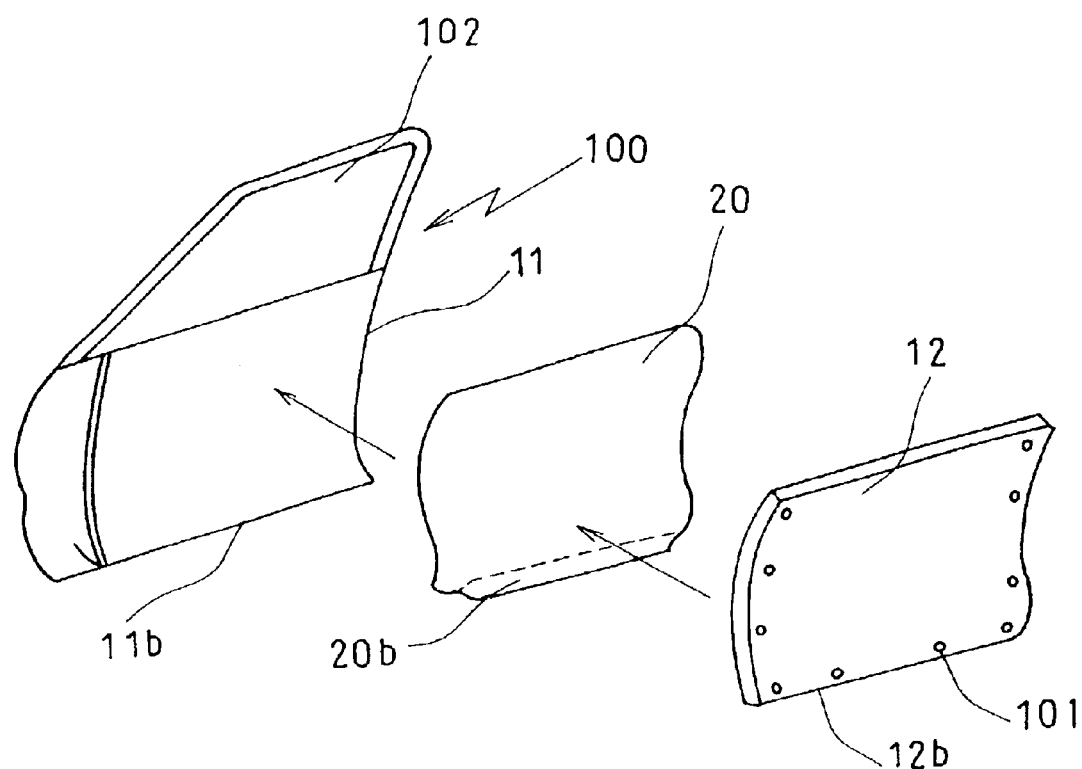
FIG. 22 is a decomposed perspective view showing a door which a noise insulation sheet according to a seventh aspect of the invention is attached.
Figure 23:
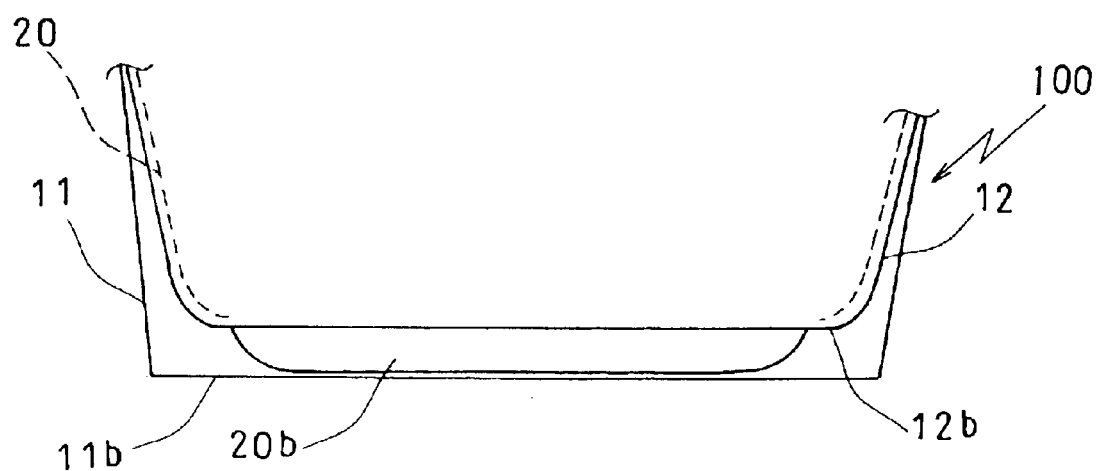
FIG. 23 is an enlarged side view showing a primary part of a noise insulation sheet according to a seventh aspect of the invention.

Referring to FIGS. 22 and 23, an embodiment of a noise insulation sheet according to the present invention will be described. FIG. 22 is a decomposition perspective view showing a door in which a noise insulation sheet according to an embodiment of the present invention is attached. FIG. 23 is an enlarged side view showing a part of the noise insulation sheet according to an embodiment of the invention. Identical numerals are given to the identical parts described in the first or previous embodiments, and explanation thereof will be excluded.

A noise insulation sheet 20 according to an embodiment of the present invention is provided as it is hung down like a curtain between a door inner panel 11 and a door trim 12 of a car door structure. At the interior side of the door inner panel 11, the door trim 12 for interiors is attached where the lower end 12b of the door trim 12 positions above the lower end 11b of the door inner panel 11.

The upper end of the noise insulation sheet 20 is attached to the door inner panel 11 or the door trim 12. The door trim 12 is fixed to the door inner panel 11 with clips 101. As shown in FIG. 2, the upper part of the noise insulation sheet 20 may be attached to an inner weather strip 15 secured to the door trim 12 (or, it may be fixed to the door inner panel 11). Furthermore, it is effective to make a slit in the noise insulation sheet 20 in order to install the harness such as a door handle, power windows and a lock to a door panel at the time of an installation operation, which makes easy to uninstall those parts as well.

The noise insulation sheet 20 is made of a cloth having a concave shape, which fully covers the door trim 12. The noise insulation sheet 20 is installed as such that the lower end 20b thereof protrudes in a downward direction from the lower end 12b of the door trim 12. And as shown in FIG. 23, the lower end 20b of the noise insulation sheet 20 protruded from the lower end 12b of the door trim 12 is attached to the interior side of the door inner panel 11 by such as a tape and clips.

As described above, by protruding the lower part 20b of the noise insulation sheet 20 from the lower end 12b of the door trim 12, it can mitigate the invasion and leakage of the noise through a gap formed at the lower part of the door 100 between the lower part of the door trim 12 and the door inner panel 11, so that the noise isolation effect further improves.

(Eighth Embodiment of the Invention)

According to the door structure of the first embodiment shown in FIG. 2 and FIG. 5, the inner weather strip 15 or 35 and the door trim 12 or 32 should be attached before they are transported to an installation field of the parts where a car door structure is composed, so that there is a problem that the parts become larger and a transportation operation becomes complicated.

Further, in case the inner weather strips 15 or 35 is attached to the door trim 12 or 32, the noise insulation sheet 20 is hung down like a curtain from the upper side to the lower side of the door inner panel 11, so that there is also a problem that it is difficult to pick out the harness (not shown) of a door 100 from the side of the noise insulation sheet 20 to the side of the door trim 12 or 32.

Therefore, an object of the eighth embodiment of the present invention is to provide a car door structure where it is easy to transport the parts of a car door structure, and it is also easy to pick out harness at the time of an installation operation of the car door structure.

Figure 24:
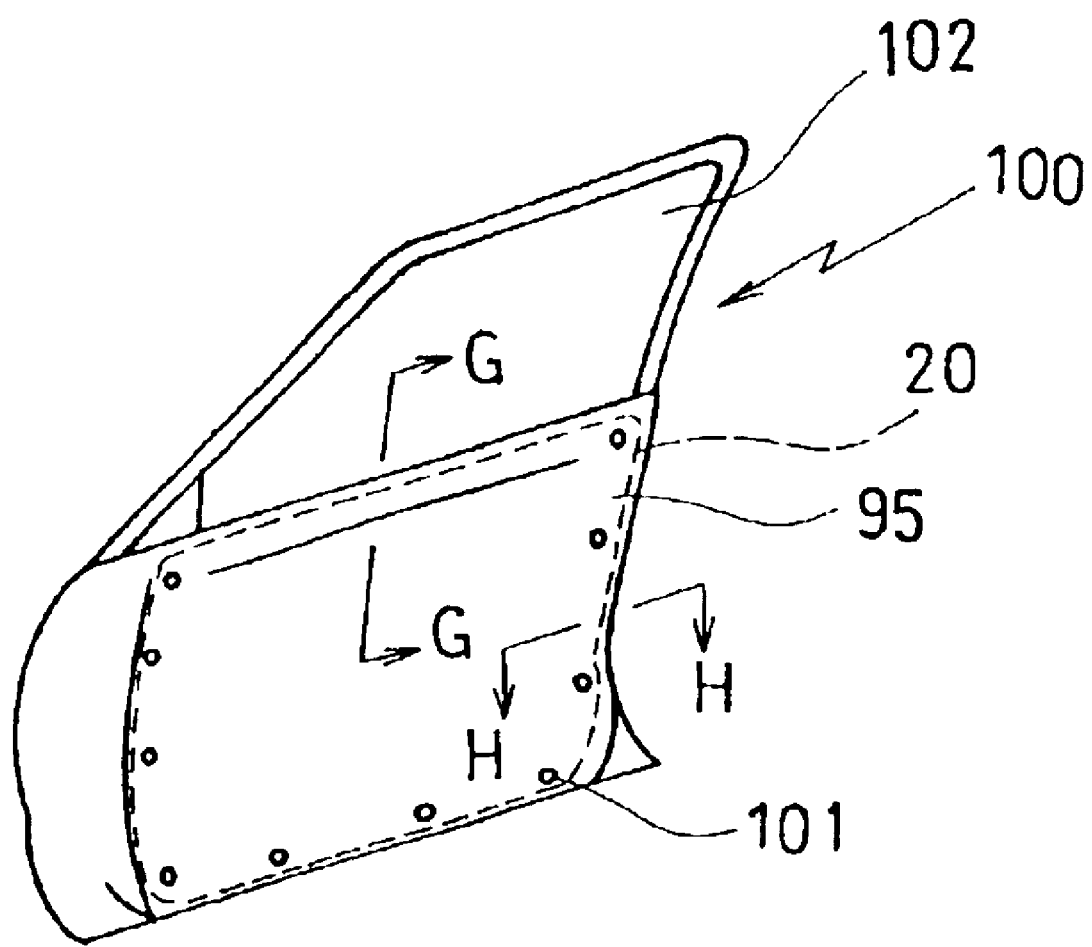
FIG. 24 is a perspective view showing an outlook of a car door structure according to an eighth aspect of the invention.
Figure 25:
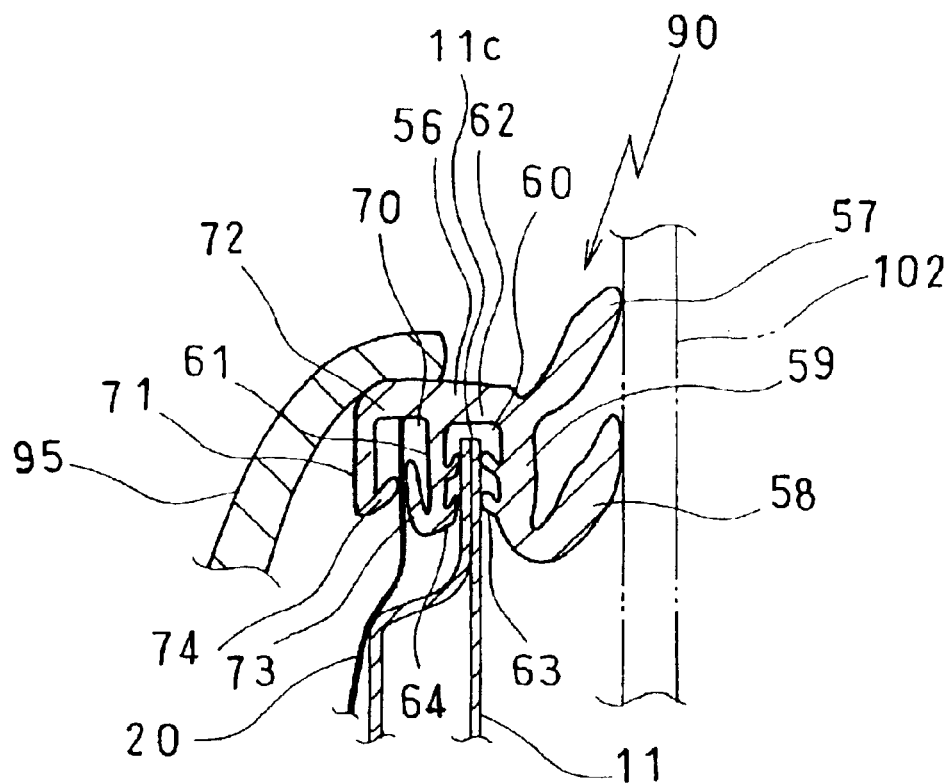
FIG. 25 is an enlarged sectional view along line G—G in FIG. 24 showing a car door structure according to an eighth aspect of the invention.
Figure 26:
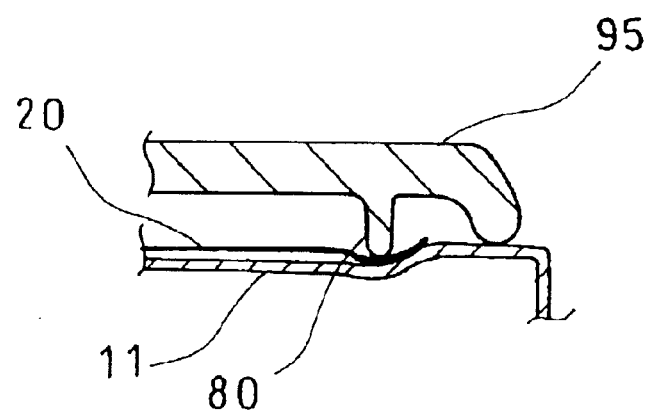
FIG. 26 is an enlarged sectional view along line H—H in FIG. 24 showing a door structure shown in FIG. 25.
Figure 27:
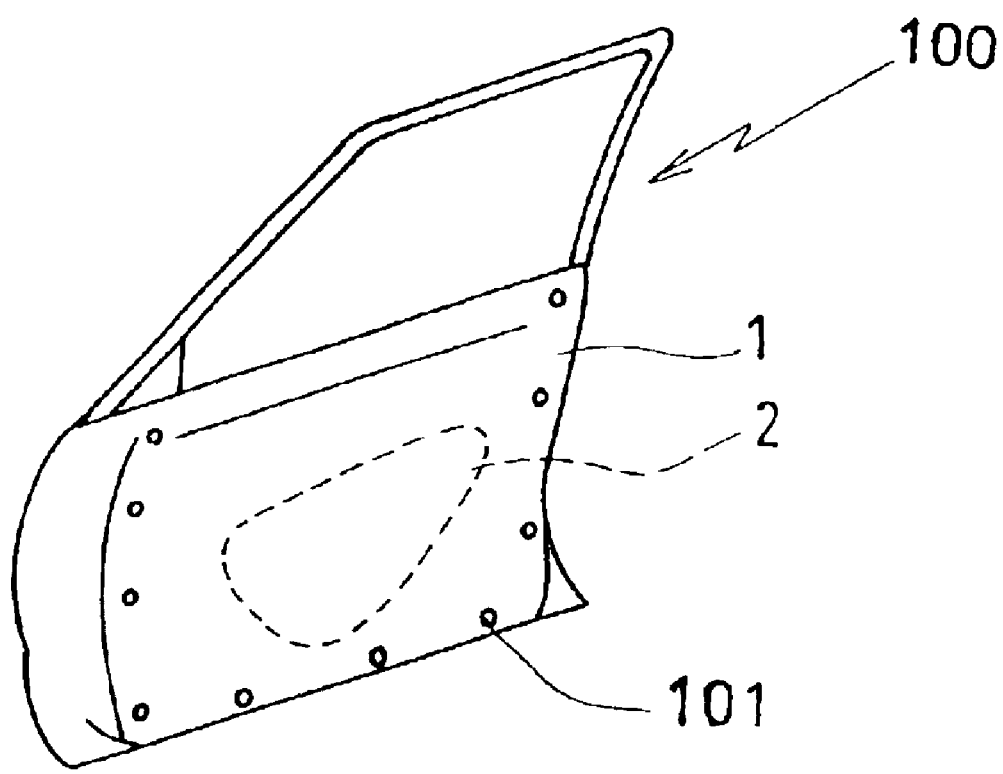
FIG. 27 is a perspective view showing a car door structure according to a prior art.

Referring to FIGS. 24, 25 and 26, an eighth embodiment of a car door structure according to the present invention will be described. FIG. 24 is a perspective view of a car door structure according to an embodiment of the invention. FIG. 25 shows a car door structure according to an embodiment of the invention, and it is an enlarged sectional view along line G—G in FIG. 24. FIG. 26 is an enlarged sectional view along line H—H in FIG. 24. Identical numerals are given to the identical parts described in the first and previous embodiments, and explanation thereof will be excluded.

The car door structure composes a door 100, wherein a door trim 95 for interiors is attached to the interior side of a door inner panel 11 positioned inside the belt line of the car, and an inner weather strip 90 making a resilient contact with a door glass 102 is attached to the door inner panel 11. A noise insulation sheet 20 is provided between the door inner panel 11 and the door trim 95 as it is hung down like a curtain from the upper side to the lower side of the door inner panel 11.

The inner weather strip 90 comprises an attachment base 56, an upper and lower seal lip parts 57, 58, each of which makes a resilient contacts with the inner side of a door glass, and an attachment mechanism for the noise insulation sheet 20 which is provided in the interior side of the the attachment base 56. The attachment base 56 comprises a channel part 60 of a concave shape in section having an opening in the downward direction, as well as an outside wall 59, an inside wall 61 and a bottom wall 62, forming the channel part 60. The attachment base 56 also comprises a plurality of lips 63, 64 for holding the inner panel 11, projecting from both the inner side of the outside wall 59 and the inside wall 61 toward the bottom wall 62. The attachment base 56 is formed to fit only into the door inner panel 11 by merely inserting the upper edge part 11c thereof.

The inner weather strip 90 is in contact with the door trim 95 but it is not fitted to the door trim 95. The inner weather strip 90 may not be in contact with the door trim 95.

The outside side wall 59 also functions to support the seal lip parts 57, 58.

In this embodiment, an attachment mechanism of the noise insulation sheet 20 is composed of the channel part 70 having an opening facing to the downward direction similar to the attachment base 56, the outside, inside and the bottom walls 61, 71, 72 for forming the channel part 70, and a plurality of projections 73, 74 projected from the inside walls 61, 71 (although, in this embodiment only two projections are provided, the number thereof is not limited as far as it comprises more than two). And, the attachment function is such that the upper part of the noise insulation sheet 20 is inserted into the channel part 70 from underneath. Once the noise insulation sheet 20 is inserted into the channel part 70, the projections 73, 74 make tight contacts with the upper part of the sheet 20 both from the outside and interior side of the car and prevent the sheet 20 from removing.

Although in this embodiment, the side wall 61 is formed as the inside wall of the attachment base 56 and as the outside wall of the attachment mechanism, the wall 61 may be formed independently.

Further, as shown in FIG. 26, at the outside periphery of the door trim 95 (the outside periphery of the door inner panel 11), there is uniformed a pressing piece 80 for pressing the noise insulation sheet 20 to the door inner panel 11 during the door installation operation. (The pressing piece 80 may be formed separately.) The pressing piece 80 may be provided along the entire periphery of the door trim 95 or it may be provided partially. Further, the piece 80 may be formed separated into a plurality of pieces, and they may be provided at certain areas. By providing the pressing piece(s) 80, the noise insulation sheet 20 is prevented from protruding out of the door trim 95, and the car door structure is prevented from deteriorating an outlook thereof. Further, the noise insulation sheet 20 can be pressed to the door inner panel 11 using clips 101 which are used for securing the door trim 95 to the inner panel 11.

According to the car door structure of this embodiment, the noise insulation sheet creates two space rooms between the door inner panel 11 and the door panel 95, so that the noise isolation effect of the car door structure improves. It has become clear as a result of a experimental test completed by the inventors of this invention that the car door structure according to the embodiment of the present invention can insulate a noise more than 2 dB in the range of 100 to 10000 Hz compared to the prior art which uses felt, urethane, pad material and a noise insulation cover.

Further, it is not necessary to transport the inner weather strip 90 to an installation field with a combination of the door trim 95. It is because the door inner weather strip 90 is fixed with the noise insulation sheet 20 and the door inner panel 11, and it is not fixed with the door trim 95 though it may contact to the door trim 95 when it is installed.

That is, the inner weather strip 90 only or the inner weather strip 90 with a combination of the noise insulation sheet 20 only should be transported to the installation field, while the door trim 95 is separated from the door inner panel 11, so that the parts of the car door structure are maintained smaller in size, and that a transportation operation becomes easy.

Further, a removing operation of the harness becomes easy during the installation operation of the car door structure since operators are able to reach their hands to the harness of the door 100 from any place of the door 100 side until the door trim 95 is fixed to the door panel. Furthermore, a performance of the installation operation of the car door structure improves since the operators are able to check the harness with their eyes.

In this embodiment of the invention, the inner weather strip 90 is provided with the attachment mechanism which holds the noise insulation sheet 20. Instead of providing the attachment mechanism, the upper part of the noise insulation sheet 20 may be attached to the inner weather strip 90 with a stapler, thread, a double-sided adhesive tape, adhesion material, clips or the like.

Further, a slit may be provided in the noise insulation sheet 20 in order to further improve the removing operation of the harness, e.g., a door handle, power window and a lock of the door panel.

EFFECTS OF THE INVENTION

According to the first, second, third, sixth and seventh aspects of the inventions, a new space room is provided between the door inner panel and the door trim as the noise insulation sheet is hung down between the door inner panel and the door trim like a curtain. With this newly provided room, the noise insulation effect improves compared to the conventional arts which are provided with felt, urethane, pad material, the noise insulation cover, and the like.

Further, the noise insulation sheet can be easily installed since it is merely hung down from the upper side to the lower side like a curtain.

Particularly, according to the seventh aspect of the invention, the noise insulation sheet covers at least the upper part of the door inner panel, so that a leakage of the noise through the upper portion of the door inner panel can be mitigated.

Further, it becomes possible to reduce a material cost of the noise insulation sheet, and it becomes easy to install the noise insulation sheet by providing the noise insulation sheet approximately to an upper half or lower half of the entire door inner panel, or by providing the sheet in the mid portion of the door inner panel while the entire door inner panel is equally divided approximately into three sections in a vertical or a horizontal direction thus making the noise insulation sheet smaller in size.

Particularly, according to the eighth aspect of the invention, the installation operation becomes easier because an installation operation is completed by attaching the inner weather strip, to which the noise insulation sheet is attached in advance, to the door trim, According to the tenth aspect of the invention, the noise insulation sheet can be firmly fixed since the upper end of thereof is fixed between the leg parts of the door trim, which supports some portions of the inner weather strip from underneath, and a part of the inner weather strip.

According to the eleventh aspect of the invention, the noise insulation sheet is unused at the leg parts where the upper end of the sheet is lowered, so that the noise insulation sheet is saved in quantity for an amount the sheet is lowered, and so that the noise insulation sheet can be saved in quantity and efficiently used. Further, the noise insulation sheet is not provided between the leg parts and the support part of the inner weather strip, so that an adhesion nature of the support part against the leg parts increases.

According to the twelfth aspect of the invention, the noise insulation sheet does not protrude out of the edge of the door trim, and the noise insulation effect does not decrease nor the outlook of the door decreases since the noise insulation sheet is hung down between the door inner panel and the door trim like a curtain, while the both sides or the lower part of the noise insulation sheet is adequately positioned by the pins or clips.

Particularly, according to the thirteenth, fourteenth and fifteenth aspects of the invention, the edge portion of the noise insulation sheet is sufficiently prevented from protruding out to the door trim because the clips are provided at both sides or the lower portion of the noise insulation sheet.

According to the sixteenth and seventeenth aspects of the invention, an outlook of the car door structure does not decrease nor the noise insulation effect decrease since the edge part of the noise insulation sheet, which is hung down like a curtain between the door inner panel and the door trim, is pushed into the groove having a concave shape in section and is fixed not to protrude out of the edge of the door trim.

According to the eighteenth, nineteenth, twentieth and twenty first aspects of the invention, the noise insulation effect improves since two rooms are created between the door inner panel and the door trim by an installation of the noise insulation sheet between the door inner panel and the door trim.

Further, it is unnecessary to transport the door trim with the door inner weather strip secured to the door trim to an installation field because the door inner weather strip is secured to the door inner panel and it is not secured to the door trim.

That is, the inner weather strip alone or the inner weather strip which the noise insulation sheet secured to the inner weather strip can be transported to the installation field separated from the door trim or the door inner panel, so that those parts can be transported to the installation field in a smaller size, and that a transportation operation becomes easier.

Furthermore, a removing operation of the harness becomes easier during an installation operation since operators are able to reach their hands to the harness of the door from any side area of the door. And, the installation operation can be pursued efficiently because the door installation operation can be completed by checking the harness with operators' eyes.

Further, the installation operation can be performed easily since the noise insulation sheet can be fixed merely by inserting the upper end of the sheet to the inner weather strip. And, the noise insulation sheet can be firmly fixed to the inner weather strip because a plurality of projection pieces of the attachment mechanism tightly stick to and hold the upper end of the noise insulation sheet both from the outer and interior sides of the car when the installation operation is completed.

Furthermore, the noise insulation sheet is prevented from shifting its position and an outlook of the door structure can be properly maintained since the door trim is provided with pressing pieces at the door inner panel side, which press the noise insulation sheet to the door inner panel when the sheet is installed.

Further, an invasion of water invaded in the door inner panel can be prevented from further invading in the interior side of the door trim by pressing the noise insulation sheet around holes provided to the door inner panel with pins projected from the door trim which force the noise insulation sheet to the door inner panel. In this case, at least the external surface (which is by the side of the door inner panel) of the noise insulation sheet should be formed with a material having a small water absorptivity.

According to the twenty second aspect of the invention, fewer noise invades or leaks through a gap formed at the lower part of the door between the lower part of the door trim and the door inner panel, and the noise isolation effect furter increases because the lower part of the noise insulation sheet, which is hung down like a curtain between the door inner panel and the door trim, protrudes from the bottom edge of the door trim, and the protruded part of the sheet is fixed to the interior side of the door inner panel.

Further, much less time is required in an installation operation, and a better outlook of the door structure can be obtained since the protruded part of the noise insulation sheet, extending from the lower end of the noise insulation sheet, is applied to the lower part of the door structure, instead of applying an individual part which is prepared separate from the noise insulation sheet.

What is claimed is:

1. A car door structure comprising:
   a door inner panel,
   an interior door trim,
   a noise insulation sheet,
   an inner weather strip, and
   a door glass,
   wherein said door trim is installed in an interior side of the door inner panel;
   wherein said inner weather strip comprises seal lips for making resilient contacts with the door glass;
   wherein said inner weather strip is secured to at least one of the door inner panel and the door trim;
   wherein said noise insulation sheet is provided between the door inner panel and the door trim;
   wherein said noise insulation sheet is hung down from an upper side to a lower side of the door inner panel like a curtain; and
   wherein said noise insulation sheet is fixed to the inner weather strip at the upper part thereof.

2. A car door structure comprising:
   a door inner panel,
   an interior door trim, and
   a noise insulation sheet,
   wherein said interior door trim is installed in an interior side of the door inner panel;
   wherein said noise insulation sheet is provided between the door inner panel and the door trim;
   wherein said noise insulation sheet is hung down from an upper side to the lower side of the door inner panel like a curtain;
   wherein said noise insulation sheet is fixed to at least one of the door inner panel or the door trim;
   wherein the noise insulation sheet is provided only at a central part of the door inner panel; and
   wherein said central part comprises a middle portion of the door inner panel when the door inner panel is divided into three sections in one of a vertical direction and a horizontal direction.

3. A car door structure comprising:
   a door inner panel,
   an interior door trim,
   a noise insulation sheet,
   an inner weather strip, and
   a door glass,
   wherein the door trim is provided over the door inner panel on an interior side of the door inner panel;
   wherein the inner weather strip comprises seal lips for making resilient contacts with the door glass;
   wherein the weather strip is provided at an upper part of the door trim;
   wherein the noise insulation sheet is hung down between the door inner panel and the door trim like a curtain;
   wherein the noise insulation sheet covers at least an upper edge of the door inner panel; and
   wherein an upper end of the noise insulation sheet is fixed to the inner weather strip.

4. A car door structure comprising:
   a door inner panel,
   an interior door trim,
   a noise insulation sheet,
   an inner weather strip, and
   a door glass,
   wherein the door trim is provided over the door inner panel to an interior side of the door inner panel;
   wherein the inner weather strip comprises seal lips for making resilient contacts with the door glass;
   wherein the weather strip is provided at an upper part of the door trim;
   wherein the noise insulation sheet is hung down between the door inner panel and the door trim like a curtain;
   wherein the noise insulation sheet covers at least an upper edge of the door inner panel; and
   wherein:
   the door trim comprises a channel part at the upper part thereof;
   said channel part receives an attachment base of the inner weather strip;
   said channel part has a concave shape in section;
   said channel part is provided with leg parts at a lower end thereof extending in a downward direction;
   said leg parts partially support the inner weather strip from underneath; and
   said noise insulation sheet is fixed between the leg parts and some portions of the inner weather strip corresponding to the leg parts.

5. A car door structure comprising:
   a door inner panel,
   an interior door trim,
   a noise insulation sheet,
   an inner weather strip, and
   a door glass,
   wherein the door trim is provided over the door inner panel to an interior side of the door inner panel;
   wherein the inner weather strip comprises seal lips for making resilient contacts with the door glass;
   wherein the weather strip is provided at an upper cart of the door trim;
   wherein the noise insulation sheet is hung down between the door inner panel and the door trim like a curtain;
   wherein the noise insulation sheet covers at least an upper edge of the door inner panel; and
   wherein:
   the door trim comprises a channel part at the upper part thereof;
   said channel part receives an attachment base of the inner weather strip;
   said channel part has a concave shape in section;
   said channel part is provided with leg parts at a lower part thereof with certain intervals;
   said leg parts extend in a downward direction;
   said leg parts receive some portions of the inner weather strip;
   an upper part of the noise insulation sheet is fixed to some portions of the inner weather strip where the leg parts are not provided and where the inner weather strip is exposed; and said noise insulation sheet is not fixed to the inner weather strip at portions where the leg parts are provided as an upper end of the sheet is lowered.

6. A car door structure comprising:

a door inner panel, an interior door trim, a noise insulation sheet, and an inner weather strip, wherein said door trim is installed in an interior side of the door inner panel;

wherein said noise insulation sheet is provided between the door inner panel and the door trim;

wherein said noise insulation sheet is hung down from an upper side to a lower side of the door inner panel like a curtain;

wherein an upper end of the noise insulation sheet is fixed to at least one of the door inner panel, the door trim and the inner weather strip;

wherein said inner weather strip is fixed to at least one of the door inner panel and the door trim;

wherein said door trim is provided with pins at at least one of (i) both left and right sides thereof and (ii) a lower side thereof;

wherein said pins projects toward the door inner panel;

wherein said pins position the noise insulation sheet to the door inner panel so as not to protrude out of an edge of the door trim by one of (i) passing through the noise insulation sheet and (ii) pushing the noise insulation sheet to the door inner panel.

7. A car door structure comprising:

a door inner panel, an interior door trim, a noise insulation sheet, and an inner weather strip, wherein said door trim is installed in an interior side of the door inner panel;

wherein said noise insulation sheet is provided between the door inner panel and the door trim;

wherein said noise insulation sheet is hung down from an upper side to a lower side of the door inner panel like a curtain;

wherein an upper end of the noise insulation sheet is fixed to at least one of the door inner panel, door trim and the inner weather strip;

wherein said weather strip is fixed to one of the door inner panel and the door trim;

wherein said noise insulation sheet is provided with clips at at least one of (i) both left and right sides thereof and (ii) a lower side thereof;

wherein said clips position the noise insulation sheet to the door trim so as not to protrude out of an edge of the door trim;

wherein the clips also fix the noise insulation sheet to the door inner panel; and wherein:

each clip comprises a neck part, a head part, an umbrella part and a leg part;

said head part is formed as a bulge above the neck part;

said umbrella part is formed as a bulge below the neck part;

said leg part is formed below the umbrella part;

each clip is secured to the noise insulation sheet by inserting the head part into a hole of the noise insulation sheet;

said noise insulation sheet is fixed to the door trim by engaging the neck part with an attachment part provided in the door trim; and said noise insulation sheet is fixed to the door inner panel by inserting the leg part into a hole provided in the door inner panel.

8. A noise insulation sheet in a car door structure wherein said car door structure comprises a door inner panel, an interior door trim, and an inner weather strip;

wherein said door trim is installed in an interior side of the door inner panel;

wherein a lower end of the door trim is positioned above a lower end of the door inner panel;

wherein said noise insulation sheet is provided between the door inner panel and the door trim;

wherein an upper end of the noise insulation sheet is fixed to at least one of the door inner panel, the door trim and the inner weather strip, which is fixed to at least one of the door inner panel and the door trim;

wherein said noise insulation sheet is hung down from an upper side to a lower side of the door inner panel like a curtain;

wherein said noise insulation sheet is fixed to the interior side of the door inner panel; and wherein the lower part of the noise insulation sheet protrudes from the lower end of the door trim.

9. A car door structure comprising:

a door inner panel, an interior door trim, and a noise insulation sheet, wherein said door trim is installed in an interior side of the door inner panel;

wherein said noise insulation sheet is provided between the door inner panel and the door trim;

wherein said noise insulation sheet is hung down from an upper side to a lower side of the door inner panel like a curtain;

wherein said noise insulation sheet is fixed to at least one of the door inner panel and the door trim at an upper part thereof;

wherein the noise insulation sheet is provided only at a central part of the door inner panel; and wherein said central part comprises a middle portion of the door inner panel when the door inner panel is divided into three sections in one of a vertical direction and a horizontal direction.

10. A car door structure comprising:

a door inner panel, an interior door trim, a noise insulation sheet, and an inner weather strip, wherein said door trim is installed in an interior side of the door inner panel;

wherein said noise insulation sheet is provided between the door inner panel and the door trim;

wherein said noise insulation sheet is hung down from an upper side to a lower side of the door inner panel like a curtain;

wherein an upper end of the noise insulation sheet is fixed to at least one of the door inner panel, the door trim and the inner weather strip;

wherein said inner weather strip is secured to at least one of the door inner panel and the door trim;

wherein said door trim comprises a groove part at a periphery of the door inner panel side;

wherein said groove part is provided one of continuously and intermittently;

wherein said channel part has a concave shape in section;

wherein said noise insulation sheet is pushed at an edge part thereof into the groove part of the door trim; and wherein said noise insulation sheet is positioned such that the edge part thereof does not protrude out of the door trim.

11. The car door structure claimed in claim 10, wherein the groove part is integrally formed with the door trim.

12. A car door structure comprising:

a door inner panel, an interior door trim, and a noise insulation sheet, wherein said door trim is installed in the interior side of the door inner panel;

wherein said noise insulation sheet is provided between the door inner panel and the door trim;

wherein said noise insulation sheet is hung down from an upper side to the lower side of the door inner panel like a curtain; and wherein said noise insulation sheet is fixed to at least one of the door inner panel and the door trim at a left side part and a right side part thereof.

13. The car door structure claimed in claim 12, wherein the noise insulation sheet is provided at one of substantially an upper half and substantially a lower half of the door inner panel.

14. The car door structure claimed in claim 12, wherein the noise insulation sheet is provided at a central part of the door inner panel;

wherein said central part comprises a middle portion of the door inner panel when the door inner panel is divided into three sections in one of a vertical direction and a horizontal direction.

15. A car door structure comprising:

a door inner panel, an interior door trim, a noise insulation sheet, and an inner weather strip, wherein said door trim is installed in interior side of the door inner panel;

wherein said inner weather strip comprises seal lips for making resilient contacts with a door glass;

wherein said inner weather strip is fixed to the door inner panel;

wherein said noise insulation sheet is provided between the door inner panel and the door trim;

wherein said noise insulation sheet is hung down from an upper side to a lower side of the door inner panel like a curtain;

wherein said noise insulation sheet is fixed to the inner weather strip at an upper part of the noise insulation sheet; and wherein said inner weather strip fits with an upper end of the door inner panel.

16. The car door structure claimed in claim 15, wherein the door trim comprises pressing pieces at a periphery thereof, said pressing pieces project toward the door inner panel, and said pressing pieces press the noise insulation sheet to the door inner panel when installed.

17. The car door structure claimed in claim 15, wherein the inner weather strip is provided with an attachment mechanism at an interior side thereof; and wherein an upper end of the noise insulation sheet is inserted into the attachment mechanism for attachment to the inner weather strip.

18. The car door structure claimed in claim 17, wherein the door trim comprises pressing pieces at a periphery thereof, said pressing pieces project toward the door inner panel, and said pressing pieces press the noise insulation sheet to the door inner panel when installed.

19. The car door structure claimed in claim 17, wherein the attachment mechanism comprises a channel part and a plurality of projection pieces;

wherein said channel part has a concave shape in section; and wherein said projection pieces project from side walls of the channel part toward a bottom wall of the channel part.

20. The car door structure claimed in claim 19, wherein the door trim comprises pressing pieces at a periphery thereof, said pressing pieces project toward the door inner panel, and said pressing pieces press the noise insulation sheet to the door inner panel when installed.

* * * * *